(12) United States Patent  
Sambhwani et al.

(10) Patent No.: US 12,506,505 B2  
(45) Date of Patent: Dec. 23, 2025

(54) ELECTRONIC DEVICES WITH APPLICATION-BASED RADIO-FREQUENCY EXPOSURE MANAGEMENT

(71) Applicant: Apple Inc., Cupertino, CA (US)

(72) Inventors: Sharad Sambhwani, San Diego, CA (US); Madhukar K. Shanbhag, Santa Clara, CA (US); Sanjeevi Balasubramanian, San Jose, CA (US); Dirk Nickisch, Oberpframmern (DE); Shiva Krishna Narra, San Jose, CA (US); Vishwanth Kamala Govindaraju, Mountain View, CA (US); Sriram Subramanian, San Jose, CA (US)

(73) Assignee: Apple Inc., Cupertino, CA (US)

( * ) Notice: Subject to any disclaimer, the term of this patent is extended or adjusted under 35 U.S.C. 154(b) by 653 days.

(21) Appl. No.: 17/745,789

(22) Filed: May 16, 2022

(65) Prior Publication Data

US 2023/0370107 A1    Nov. 16, 2023

(51) Int. Cl.
*H04B 1/3827*    (2015.01)
*H04W 52/36*    (2009.01)

(52) U.S. Cl.
CPC ........ *H04B 1/3838* (2013.01); *H04W 52/367* (2013.01)

(58) Field of Classification Search
CPC .................... H04B 1/3838; H04W 52/367
(Continued)

(56) References Cited

U.S. PATENT DOCUMENTS 9,661,590 B2    5/2017 Haim et al.
10,834,782 B2    11/2020 Malik et al.
(Continued)

FOREIGN PATENT DOCUMENTS

CA    2154876 A1    6/1995
CA    2292828 A1    6/2001
(Continued)

OTHER PUBLICATIONS

Joshi, et al., Output Power Levels of 4G User Equipment and Implications on Realistic RF EMF Exposure Assessments, IEEE Access, Mar. 15, 2017, pp. 4545-4550, vol. 5, Digital Object Identifier 10.1109/Access.2017.2682422.

*Primary Examiner* — Eugene Yun
(74) *Attorney, Agent, or Firm* — Treyz Law Group, P.C.; Michael H. Lyons

(57) ABSTRACT

An electronic device may include radios that transmit signals using antennas. Control circuitry may assign radio-frequency exposure (RFE) budgets to the radios. The control circuitry may classify and predict attributes of application data for transmission over the radios, may generate a per-radio data prediction based on the classified attributes, and may generate the RFE budgets based on the classified attributes. Each radio may transmit application data based on its data prediction and according to its RFE budget. A dynamic portion of the RFE budget may be reserved for control signaling. RFE planning in this way may ensure that the device optimally utilizes its RFE budget, increasing overall RFE during some time periods so sufficient transmit power is available, and ensuring that RFE is distributed across the radios depending on the amount and criticality of the data to be transmitted by each radio.

18 Claims, 8 Drawing Sheets

(58) Field of Classification Search
USPC .......................................................... 455/522
See application file for complete search history.

(56) References Cited

U.S. PATENT DOCUMENTS

| | | |
|---|---|---|
| 11,490,338 B1 | 11/2022 | Khawand |
| 2006/0056356 A1 | 3/2006 | Arvelo |
| 2012/0269078 A1 | 10/2012 | Weng et al. |
| 2016/0219527 A1 | 7/2016 | Zhao et al. |
| 2019/0028978 A1 | 1/2019 | Yasukawa et al. |
| 2019/0349017 A1 | 11/2019 | Kaidar et al. |
| 2021/0175919 A1 | 6/2021 | Badic et al. |
| 2022/0086771 A1 | 3/2022 | Lu et al. |
| 2022/0159582 A1* | 5/2022 | Lu ........................ H04W 52/36 |
| 2022/0225244 A1 | 7/2022 | Lee et al. |
| 2023/0156625 A1 | 5/2023 | Liu et al. |
| 2024/0023033 A1 | 1/2024 | Caporal Del Barrio et al. |

FOREIGN PATENT DOCUMENTS

| | | |
|---|---|---|
| WO | 2009007261 A2 | 1/2009 |
| WO | 2019160669 A1 | 8/2019 |

\* cited by examiner

ELECTRONIC DEVICES WITH APPLICATION-BASED RADIO-FREQUENCY EXPOSURE MANAGEMENT

FIELD

This disclosure relates generally to electronic devices and, more particularly, to electronic devices with wireless circuitry.

BACKGROUND

Electronic devices are often provided with wireless capabilities. An electronic device with wireless capabilities has wireless circuitry that includes one or more antennas. The antennas transmit radio-frequency signals. During transmission, the radio-frequency signals are sometimes incident upon nearby external objects such as the body of a user or another person.

Electronic devices with wireless capabilities are typically operated in geographic regions that impose regulatory limits on the amount of radio-frequency exposure produced by the electronic device in transmitting radio-frequency signals. It can be challenging to design electronic devices that meet these regulatory limits without sacrificing an excessive amount of radio-frequency performance.

SUMMARY

An electronic device may include wireless circuitry controlled by one or more processors. The wireless circuitry may include radios that transmit radio-frequency signals using at least one antenna. The radios may be subject to a regulatory specific absorption rate (SAR) and/or a regulatory maximum permissible exposure (MPE) limit over a regulatory averaging period. The wireless circuitry may include a radio-frequency (RF) exposure metric manager. The RF exposure metric manager may assign a radio-frequency exposure (RFE) budget (e.g., SAR and/or MPE budgets) to each of the radios.

The RF exposure metric manager may receive application data from one or more applications for wireless transmission over one or more of the radios. The RF exposure metric manager may classify and predict one or more attributes of the application data. For example, the RF exposure metric manager may classify the data type as continuous, single burst, or periodic burst, may classify the amount/size of data, may classify the data pattern, may classify the data priority, and may classify the radio access technology for transmission. The RF exposure metric manager may generate a data prediction for each radio based on the classified/predicted attributes. The RF exposure manager may generate the RFE budgets based on the classified/predicted attributes. Each radio may receive a respective data prediction and RFE budget.

Each radio may transmit its corresponding application data based on its data prediction and according to its RFE budget. If desired, some of the RFE budget may be reserved for control signaling. The size of the reservation may depend on whether the device is stationary, the speed of the device, the location of the device, whether the device is operating in a standalone mode, and/or crowd-sourced control signaling information. Allocating RFE budget to each radio in this way may ensure that the radios comply with RFE regulations while maximizing wireless performance and while minimizing transmit power backoffs and uplink duty cycle adjustments. For example, intelligent time domain RFE planning may ensure that the device utilizes its RFE budget in an optimized manner. This may also ensure that overall RFE budget can be increased during certain time periods so sufficient transmit power is available for each RAT to transmit latency critical application and control data. This may further ensure that RFE budget is distributed across the radios depending on the amount and criticality of the data to be transmitted by each radio.

An aspect of the disclosure provides an electronic device. The electronic device may include one or more antennas. The electronic device may include a radio communicably coupled to the one or more antennas. The electronic device may include one or more processors. The one or more processors may generate a radio-frequency exposure (RFE) budget for the radio based on a data type of wireless data to be transmitted by for an application executed by the one or more processors, the radio being configured to transmit the wireless data using the one or more antennas while limiting RFE of the radio according to the RFE budget.

An aspect of the disclosure provides a method of operating a radio on an electronic device. The method can include receiving, by one or more processors, wireless data having a first data type and wireless data having a second data type. The method can include using a transmitter to transmit, according to a radio-frequency exposure (RFE) budget, a first signal including the wireless data having the first data type. The method can include using the transmitter to transmit, according to the RFE budget, a second signal including the wireless data having the second data type, the RFE budget being based on the first data type and the second data type.

An aspect of the disclosure provides a method of operating an electronic device having a radio, one or more processors, and one or more antennas. The method can include with the one or more processors, generating classification information characterizing one or more characteristics of application data to be wirelessly transmitted for one or more software applications executed by the one or more processors. The method can include with the one or more processors, generating a radio-frequency exposure (RFE) budget based on the classification information. The method can include with the radio, using the one or more antennas to wirelessly transmit the application data subject to the RFE budget.

DETAILED DESCRIPTION

Figure 1:
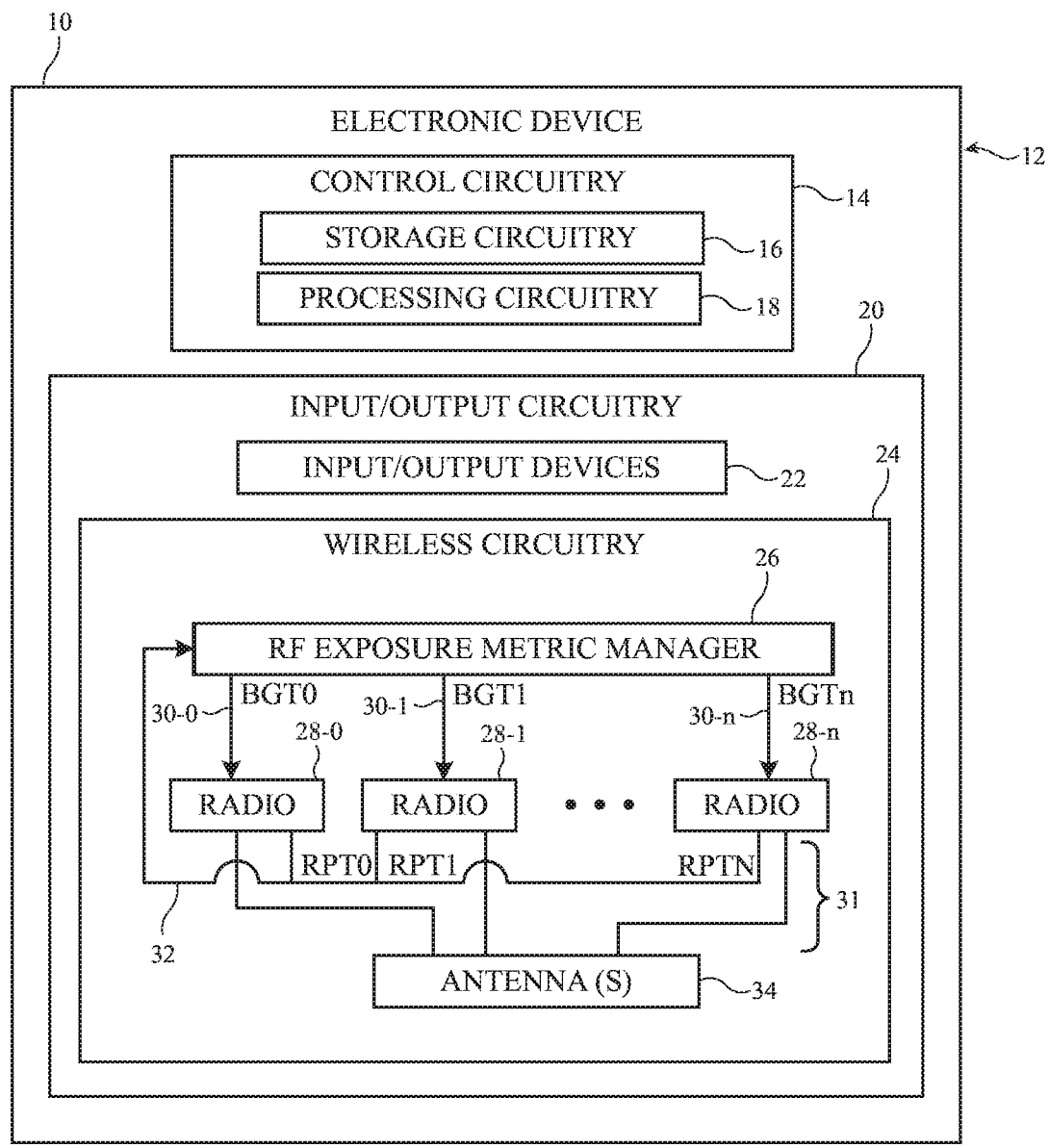
FIG. 1 is a block diagram of an illustrative electronic device having wireless circuitry with radios that transmit radio-frequency signals according to radio-frequency exposure (RFE) metric budgets in accordance with some embodiments.

Electronic device 10 of FIG. 1 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the functional block diagram of FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more processors, microprocessors, microcontrollers, digital signal processors, host processors, baseband processor integrated circuits, application specific integrated circuits, central processing units (CPUs), graphics processing units (GPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications and/or radio-based spatial ranging operations. Wireless circuitry 24 may include one or more antennas 34. Wireless circuitry 24 may also include n+1 radios 28 (e.g., a first radio 28-0, a second radio 28-1, an (n+1)th radio 28-n, etc.). Each radio 28 may include circuitry that operates on signals at baseband frequencies (e.g., baseband circuitry), signal generator circuitry, modulation/demodulation circuitry (e.g., one or more modems), radio-frequency transceiver circuitry (e.g., radio-frequency transmitter circuitry, radio-frequency receiver circuitry, mixer circuitry for downconverting radio-frequency signals to baseband frequencies or intermediate frequencies between radio and baseband frequencies and/or for upconverting signals at baseband or intermediate frequencies to radio-frequencies, etc.), amplifier circuitry (e.g., one or more power amplifiers and/or one or more low-noise amplifiers (LNAs)), analog-to-digital converter (ADC) circuitry, digital-to-analog converter (DAC) circuitry, control paths, power supply paths, signal paths (e.g., radio-frequency transmission lines, intermediate frequency transmission lines, baseband signal lines, etc.), switching circuitry, filter circuitry, and/or any other circuitry for transmitting and/or receiving radio-frequency signals using antenna(s) 34. The components of each radio 28 may be mounted onto a respective substrate or integrated into a respective integrated circuit, chip, package, or system-on-chip (SOC). If desired, the components of multiple radios 28 may share a single substrate, integrated circuit, chip, package, or SOC.

Antenna(s) 34 may be formed using any desired antenna structures. For example, antenna(s) 34 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antenna(s) 34 over time.

Transceiver circuitry in radios 28 may convey radio-frequency signals using one or more antennas 34 (e.g., antenna(s) 34 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antenna(s) 34 may transmit the radio-frequency signals by radiating the radio-frequency signals into free space (or to free space through intervening device structures such as a dielectric cover layer). Antenna(s) 34 may additionally or alternatively receive the radio-frequency signals from free space (e.g., through intervening devices structures such as a dielectric cover layer). The transmission and reception of radio-frequency signals by antenna(s) 34 each involve the excitation or resonance of antenna currents on an antenna resonating element in the antenna by the radio-frequency signals within the frequency band(s) of operation of the antenna.

Each radio 28 may be coupled to one or more antennas 34 over one or more radio-frequency transmission lines 31. Radio-frequency transmission lines 31 may include coaxial cables, microstrip transmission lines, stripline transmission lines, edge-coupled microstrip transmission lines, edge-coupled stripline transmission lines, transmission lines formed from combinations of transmission lines of these types, etc. Radio-frequency transmission lines 31 may be integrated into rigid and/or flexible printed circuit boards if desired. One or more radio-frequency transmission lines 31 may be shared between radios 28 if desired. Radio-frequency front end (RFFE) modules may be interposed on one or more radio-frequency transmission lines 31. The radio-frequency front end modules may include substrates, integrated circuits, chips, or packages that are separate from radios 28 and may include filter circuitry, switching circuitry, amplifier circuitry, impedance matching circuitry, radio-frequency coupler circuitry, and/or any other desired radio-frequency circuitry for operating on the radio-frequency signals conveyed over radio-frequency transmission lines 31.

Radios 28 may use antenna(s) 34 to transmit and/or receive radio-frequency signals within different frequency bands at radio frequencies (sometimes referred to herein as communications bands or simply as a "bands"). The frequency bands handled by radios 28 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G NR Frequency Range 1 (FR1) bands below 10 GHz, 5G NR Frequency Range 2 (FR2) bands between 20 and 60 GHz, etc.), other centimeter or millimeter wave frequency bands between 10-300 GHz, near-field communications (NFC) frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Each radio 28 may transmit and/or receive radio-frequency signals according to a respective radio access technology (RAT) that determines the physical connection methodology for the components in the corresponding radio. One or more radios 28 may implement multiple RATs if desired. As just one an example, the radios 28 in device 10 may include a UWB radio for conveying UWB signals using one or more antennas 34, a Bluetooth (BT) radio for conveying BT signals using one or more antennas 34, a Wi-Fi radio for conveying WLAN signals using one or more antennas 34, a cellular radio for conveying cellular telephone signals using one or more antennas 34 (e.g., in 4G frequency bands, 5G FR1 bands, and/or 5G FR2 bands), an NFC radio for conveying NFC signals using one or more antennas 34, and a wireless charging radio for receiving wireless charging signals using one or more antennas 34 for charging a battery on device 10. This example is merely illustrative and, in general, radios 28 may include any desired combination of radios for covering any desired combination of RATs.

Radios 28 may use antenna(s) 34 to transmit and/or receive radio-frequency signals to convey wireless communications data between device 10 and external wireless communications equipment (e.g., one or more other devices such as device 10, a wireless access point or base station, etc.). Wireless communications data may be conveyed by radios 28 bidirectionally or unidirectionally. The wireless communications data may, for example, include data that has been encoded into corresponding data packets such as wireless data associated with a telephone call, streaming media content, internet browsing, wireless data associated with software applications running on device 10, email messages, etc. Radios 28 may also use antenna(s) 34 to perform spatial ranging operations (e.g., for identifying a distance between device 10 and an external object such as external object 8). Radios 28 that perform spatial ranging operations may include radar circuitry if desired (e.g., frequency modulated continuous wave (FMCW) radar circuitry, OFDM radar circuitry, FSCW radar circuitry, a phase coded radar circuitry, other types of radar circuitry).

During radio-frequency signal transmission, some of the radio-frequency signals transmitted by antenna(s) 34 may be incident upon external objects such as external object 8. External object 8 may be, for example, the body of the user of device 10 or another human or animal. In these scenarios, the amount of radio-frequency energy exposure at external object 8 may be characterized by one or more radio-frequency (RF) energy exposure metrics. The RF exposure (RFE) metrics may include specific absorption rate (SAR) for radio-frequency signals at frequencies less than 6 GHz (in units of W/kg), maximum permissible exposure (MPE) for radio-frequency signals at frequencies greater than 6 GHz (in units of mW/cm$^2$), and total exposure ratio (TER), which combines SAR and MPE.

Regulatory requirements often impose limits on the amount of RF energy exposure permissible for external object 8 within the vicinity of antenna(s) 34 over a specified time period (e.g., an SAR limit and an MPE limit over a corresponding averaging period). Radios 28 that handle radio-frequency signals at frequencies greater than 6 GHz are sometimes referred to herein as MPE radios 28 because these radios 28 may be subject to MPE limits. Radios 28 that handle radio-frequency signals at frequencies less than 6 GHz are sometimes referred to herein as SAR radios 28 because these radios 28 may be subject to SAR limits. Radios 28 that handle signals greater than 6 GHz and signals less than 6 GHz (e.g., a cellular telephone radio 28) are subject to both SAR and MPE limits and are therefore both a SAR radio and an MPE radio.

Wireless circuitry 24 may include RF exposure metric manager 26 for ensuring that radios 28 comply with these regulatory requirements. The components of RF exposure metric manager 26 may be implemented in hardware (e.g., one or more processors, circuit components, logic gates, diodes, transistors, switches, arithmetic logic units (ALUs), registers, application-specific integrated circuits, field-programmable gate arrays, etc.) and/or software on device 10. RF exposure metric manager 26 may sometimes be referred to herein as RF exposure manager 26, RF exposure managing engine 26, RF exposure metric management circuitry 26, RF exposure metric management engine 26, or RF exposure metric management processor 26. RF exposure metric manager 26 may be coupled to each radio 28 over a respective control path 30 (e.g., control path 30-0 may couple RF exposure metric manager 26 to radio 28-0, control path 30-1 may couple RF exposure metric manager 26 to radio 28-1, control path 30-n may couple RF exposure metric manager 26 to radio 28-n, etc.).

RF exposure metric manager 26 may generate RF exposure budgets BGT for radios 28 (e.g., a first RF exposure budget BGT0 for radio 28-0, a second RF exposure budget BGT1 for radio 28-1, an (n+1)th RF exposure budget BGTn for radio 28-n, etc.). RF exposure budgets BGT may sometimes also be referred to herein as SAR/MPE budgets BGT. RF exposure metric manager 26 may provide RFE budgets BGT to radios 28 over control paths 30. Each RFE budget BGT may include a corresponding SAR budget BGT$_{SAR}$ and/or a corresponding MPE budget BGT$_{MPE}$ (e.g., depending on whether the radio subject to that budget is subject to SAR and/or MPE limits). Each radio 28 that is subject to SAR limits may receive a respective SAR budget BGT$_{SAR}$ and each radio 28 that is subject to MPE limits may receive a respective MPE budget BGT$_{MPE}$ from RF exposure metric manager 26. Each SAR budget BGT$_{SAR}$ may specify the amount of SAR that may be generated by the corresponding radio 28 in transmitting radio-frequency signals over the regulatory averaging period while still satisfying the overall SAR regulatory limits. Each MPE budget BGT$_{MPE}$ may specify the amount of MPE that may be generated by the corresponding radio 28 in transmitting radio-frequency signals over the regulatory averaging period while still satisfying the overall MPE regulatory limits. The circuitry in radios 28 may adjust the maximum transmit (TX) power level of its transmitted radio-frequency signals (e.g., using a maximum power reduction (MPR) command, etc.) to ensure that the RF exposure budget BGT for that radio remains satisfied over the averaging period.

In some scenarios, each radio or RAT in device 10 is assigned a fixed SAR/MPE budget, such that the distribution of the total available RF exposure budget across RATs remains static over time to meet the overall SAR/MPE regulatory limits on the operation of device 10 (e.g., over the averaging period). In these scenarios, each radio uses look-up tables to derive the maximum transmit power levels allowed for its fixed SAR/MPE budget and then maintains its transmit power level below that maximum transmit power level to satisfy the SAR/MPE limits. However, assigning static SAR/MPE budgets to the radios in this way without considering the radio needs for the current operating state/environment of device 10 results in sub-optimal budget distribution between the radios/RATs. For example, the part of the overall RF exposure budget that is not used by one radio cannot be re-assigned to another radio that may urgently need to transmit at a higher power level or increased duty cycle.

In order to mitigate these issues, RF exposure metric manager 26 may dynamically allocate SAR and MPE budgets to radios 28 over time (e.g., over the averaging period). RF exposure metric manager 26 may dynamically allocate SAR and MPE budgets to radios 28 based on feedback from radios 28. For example, as shown in FIG. 1, each radio 28 may be coupled to RF exposure metric manager 26 over feedback path 32. Each radio 28 may generate a SAR/MPE report RPT that identifies the amount of the assigned SAR and/or MPE budget that was consumed by that radio during different sub-periods (sometimes referred to herein as consumption periods, reporting periods, or instantaneous periods) of the averaging period. RF exposure budgets BGT may each identify the corresponding consumption period(s) to instruct radios 28 when to generate and transmit SAR/MPE reports RPT. SAR/MPE reports RPT may sometimes also be referred to herein as SAR/MPE feedback reports RPT, feedback reports RPT, SAR/MPE feedback RPT, feedback RPT, SAR/MPE feedback signals RPT, or feedback signals RPT. Radios 28 may send the SAR/MPE reports RPT to RF exposure metric manager 26 over feedback path 32 (e.g., radio 28-0 may send SAR/MPE report RPT0 to RF exposure metric manager 26, radio 28-1 may send SAR/MPE report RPT1 to RF exposure metric manager 26, radio 28-n may send SAR/MPE report RPTn to RF exposure metric manager 26, etc.). RF exposure metric manager 26 may receive each SAR/MPE report through the active transmission of the reports by radios 28 (e.g., as control signals or other control data) or by querying or retrieving the reports from radios 28 (e.g., by transmitting control signals or commands to the radios instructing the radios to transmit the corresponding report to RF exposure metric manager 26). RF exposure metric manager 26 may generate updated RF exposure budgets BGT for radios 28 based on the received SAR/MPE reports RPT and based on the current or expected communication needs of device 10 to ensure that radios 28 can continue to transmit radio-frequency signals to meet the active and dynamic needs of device 10 while still satisfying the SAR and MPE limits imposed on device 10 over the averaging period. In this way, RF exposure metric manager 26 may assign SAR/MPE budgets across RATs while ensuring an SAR/MPE compliant overall RF exposure across the RATs.

As an example, RF exposure metric manager 26 may include an RF exposure rule database, a total RF exposure calculation engine, and a budget calculation and distribution engine. The RF exposure rule database may be hard-coded or soft-coded into RF exposure metric manager 26 (e.g., in storage circuitry 16 of FIG. 1) and may include a database, data table, or any other desired data structure. The RF exposure rule database may store RF exposure rules associated with the operation of wireless circuitry 24 within different geographic regions. The RF exposure rule database may, for example, store regulatory SAR limits, regulatory MPE limits, and averaging periods $T_{AVG}$ for the SAR limits and MPE limits for one or more geographic regions (e.g., countries, continents, states, localities, municipalities, provinces, sovereignties, etc.) that impose regulatory limits on the amount of RF energy exposure permissible for external object 8 within the vicinity of antenna(s) 34. As an example, the RF exposure rule database may store a first SAR limit, a first MPE limit, and a first averaging period $T_{AVG}$ imposed by the regulatory requirements of a first country, a second SAR limit, a second MPE limit, and a second averaging period $T_{AVG}$ imposed by the regulatory requirements of a second country, etc. The entries of the RF exposure rule database may be stored upon manufacture, assembly, testing, and/or calibration of device 10 and/or may be updated during the operation of device 10 over time (e.g., periodically or in response to a trigger condition such as a software update or the detection that device 10 has entered a new country for the first time).

The total RF exposure calculation engine in RF exposure metric manager 26 may receive SAR/MPE reports RPT from radios 28 over feedback path 32. Each SAR/MPE report RPT may include a corresponding SAR report and/or a corresponding MPE report. For example, the SAR/MPE report RPT0 produced by radio 28-0 of FIG. 1 may include a first SAR report and a first MPE report, the SAR/MPE report RPT1 produced by radio 28-1 may include a second SAR report and a second MPE report, etc. For radios 28 that do not operate at frequencies greater than 6 GHz (e.g., SAR radios 28), the MPE report generated by that radio may be null or empty or that radio 28 may omit an MPE report from its SAR/MPE report RPT. Similarly, for radios 28 that do not operate at frequencies less than 6 GHz (e.g., MPE radios 28), the SAR report generated by that radio may be null or empty or that radio 28 may omit a SAR report from its SAR/MPE report RPT.

The total RF exposure calculation engine may generate (e.g., compute, calculate, identify, produce, etc.) an average consumed SAR value, an average consumed MPE value, and a consumed total exposure ratio value based on the SAR/MPE reports RPT received over feedback path 32, the averaging period $T_{AVG}$ received from the RF exposure rule database, and the SAR limit and the MPE limit received from the RF exposure rule database. The RF exposure rule database may identify a particular averaging period $T_{AVG}$, a particular SAR limit, and a particular MPE limit to send to the total RF exposure calculation engine based on the current geographic location of device 10.

The total RF exposure calculation engine may generate an average SAR value based on the SAR reports in the SAR/MPE reports RPT received over feedback path 32. The average SAR value may be indicative of the average amount of the current SAR budgets consumed by all of the radios 28 in wireless circuitry 24 during the current averaging period $T_{AVG}$. Similarly, the total RF exposure calculation engine may generate an average MPE value based on the MPE reports in the SAR/MPE reports RPT received over feedback path 32. The average MPE value may be indicative of the average amount of the current MPE budgets consumed by all of the radios 28 in wireless circuitry 24 during the current averaging period $T_{AVG}$. The total RF exposure calculation engine may generate a total exposure ratio value indicative of the combined SAR and MPE consumption by all of the radios 28 in wireless circuitry 24 during the current averaging period $T_{AVG}$.

The budget calculation and distribution engine in RF exposure metric manager 26 may generate updated RF exposure budgets BGT for each radio 28 in wireless circuitry 24 based on the average SAR value, the average MPE value, the total exposure ratio value, the SAR limit, and the MPE limit. The budget calculation and distribution engine may also generate the updated RF exposure budgets BGT while taking into account which radios may or may not need to perform more or less transmission at any given time. For example, the budget calculation and distribution engine may generate updated RF exposure budgets BGT based on SAR/MPE distribution policies, SAR/MPE radio transmit (TX) activity factors, SAR/MPE radio statuses, and/or SAR/MPE radio usage ratios. The SAR/MPE distribution policies may identify which SAR radios 28 require SAR budget at a current point in time and which MPE radios 28 require MPE budget at a current point in time (e.g., because the radios already have a wireless connection established with external communication equipment). The SAR/MPE radios 28 that are actively communicating with external communications equipment and conveying a relatively large amount of data may, for example, require more SAR/MPE budget and may be allocated more SAR/MPE budget than the SAR/MPE radios 28 that are not actively communicating with the external communications equipment or that are conveying a relatively low amount of data. The SAR/MPE radio statuses may identify which SAR/MPE radios 28 are active or in an idle or sleep mode at any given time. SAR/MPE radios 28 that are active may, for example, require more SAR/MPE budget than SAR/MPE radios that are idle, inactive, or asleep. The SAR/MPE radio TX activity factors may identify the amount of transmit activity being used or expected to be used by each SAR/MPE radio 28. SAR/MPE radios 28 that have a high amount of actual or expected transmit activity may, for example, require more SAR/MPE budget than SAR/MPE radios that have a relatively small amount of actual or expected transmit activity. The SAR/MPE radio usage ratios may identify how much of past SAR/MPE budgets was actually used by each SAR/MPE radio 28. A SAR/MPE radio 28 that used all or most of its allocated SAR/MPE budget during one or more of the previous consumption periods and/or averaging periods may, for example, require more SAR/MPE budget during the next consumption period than SAR/MPE radios 28 that used relatively little of its SAR/MPE budget during the previous consumption periods. The updated RF exposure budgets BGT may serve to dynamically adjust the amount of SAR/MPE budget provided to each radio within the current averaging period $T_{AVG}$ and/or across multiple averaging periods $T_{AVG}$.

The budget calculation and distribution engine may provide each RF exposure budget BGT to the corresponding radio 28 to be subjected to that RF exposure budget over control paths 30. Each RF exposure budget BGT may include a corresponding SAR budget $BGT_{SAR}$ and/or a corresponding MPE budget $BGT_{MPE}$. For radios 28 that do not operate at frequencies greater than 6 GHz (e.g., SAR radios 28), the MPE budget generated for that radio may be null or empty or the budget calculation and distribution engine may omit an MPE budget from the RF exposure budget for that radio. Similarly, for radios 28 that do not operate at frequencies less than 6 GHz (e.g., MPE radios 28), the SAR budget generated for that radio may be null or empty or the budget calculation and distribution engine may omit an SAR budget from the RF exposure budget for that radio.

Radios 28 may use the updated RF exposure budgets produced by the budget calculation and distribution engine to transmit radio-frequency signals. The radios may produce SAR/MPE reports RPT associated with the transmission of radio-frequency signals using the updated RF exposure budgets. This process may iterate to continue to update the RF exposure budgets provided to each radio over time, thereby allowing RF exposure metric manager 26 to dynamically adjust the amount of SAR and MPE budget provided to each radio based on feedback from previous transmissions by the radio, the SAR and MPE limits imposed by the corresponding regulatory body, and the current or future communications needs of device 10.

The example of FIG. 1 is merely illustrative. While control circuitry 14 is shown separately from wireless circuitry 24 in the example of FIG. 1 for the sake of clarity, wireless circuitry 24 may include processing circuitry (e.g., one or more processors) that forms a part of processing circuitry 18 and/or storage circuitry that forms a part of storage circuitry 16 of control circuitry 14 (e.g., portions of control circuitry 14 may be implemented on wireless circuitry 24). As an example, control circuitry 14 may include baseband circuitry (e.g., one or more baseband processors) or other control circuitry that forms part of radios 28. The baseband circuitry may, for example, access a communication protocol stack on control circuitry 14 (e.g., storage circuitry 20) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer. If desired, the PHY layer operations may additionally or alternatively be performed by radio-frequency (RF) interface circuitry in wireless circuitry 24. In addition, wireless circuitry 24 may include any desired number of antennas 34. Some or all of the antennas 34 in wireless circuitry 24 may be arranged into one or more phased antenna arrays (e.g., for conveying radio-frequency signals over a steerable signal beam). If desired, antenna(s) 34 may be operated using a multiple-input and multiple-output (MIMO) scheme and/or using a carrier aggregation (CA) scheme.

Devices such as device 10 often have multiple different software applications running on control circuitry 14 in parallel. In addition, devices such as device 10 often perform concurrent wireless communications using multiple different RATs at once (e.g., device 10 may concurrently perform cellular, Bluetooth, Wi-Fi, and/or UWB communications). Different applications generate different transmit data patterns and/or may utilize different RATs for data transmission depending on the nature of the application. This can result in unsteady data transmission by wireless circuitry 24 over time. For example, some applications may require the transmission of relatively small data bursts whereas other applications may require larger continuous data transfers.

As a result, the RFE of wireless circuitry 24 is not uniform over time. During some time periods, less data is transmitted resulting in relatively low RFE whereas other time periods may involve a higher amount of data transmission, resulting in relatively high RFE that can undesirably exceed regulatory limits. To avoid exceeding regulatory limits on RFE, device 10 can be configured to limit the transmit power level or uplink (UL) duty cycle used for transmitting wireless data. However, limiting transmit power level or UL duty cycle can undesirably degrade uplink throughput and coverage. It would therefore be desirable to be able to provide wireless circuitry 24 with the ability to comply with RFE regulations without limiting transmit power level or UL duty cycle, while also accommodating the unsteady and dynamic nature of the wireless data that may be provided by one or more applications for transmission using one or more RATs.

If desired, RF exposure metric manager 26 may perform data traffic prediction to optimize the RFE scheduling for the radios 28 in wireless circuitry 24 without limiting transmit power level or UL duty cycle. Device 10 is generally required to maintain its overall RFE within regulatory limits while different RATs transmit concurrently. As a consequence, device 10 may need to reserve a certain portion of the RFE (e.g., RFE budget as allocated by RF exposure budgets BGT) for each radio 28. The amount of RFE that a radio will cause/produce depends on the amount and nature of the data to be transmitted. Instead of applying a fixed distribution of RFE across the operating radios 28, the RFE distribution (e.g., the RF exposure budgets BGT) generated by RF exposure metric manager 26 may be made dynamically and based on the data transmission characteristics/pattern of each radio. This may include, for example, application data classification, per-RAT data prediction, and overall SAR/MPE scheduling.

Figure 2:
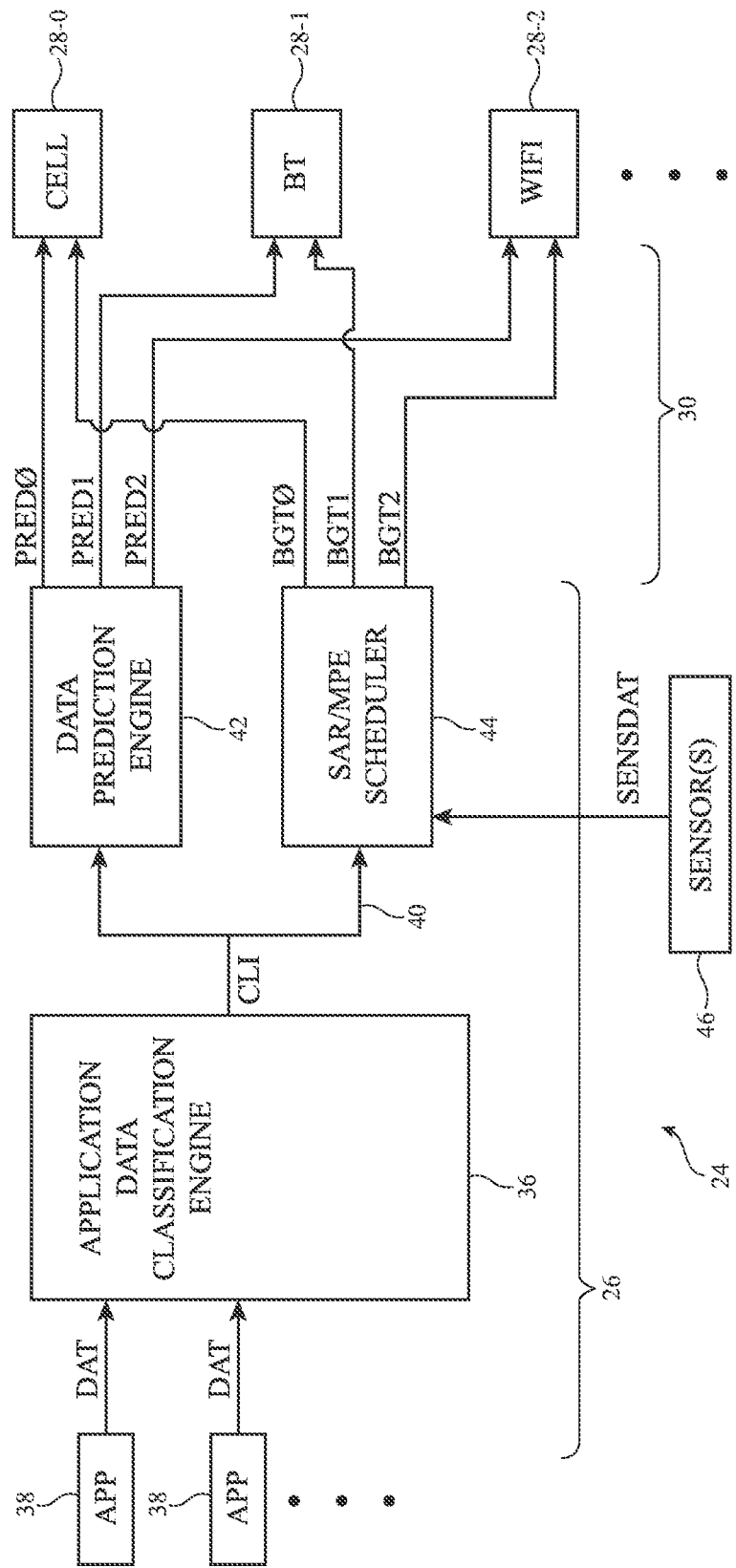
FIG. 2 is a circuit block diagram of illustrative wireless circuitry that uses radios to transmit wireless data based on corresponding RFE metric budgets and data prediction information in accordance with some embodiments.

FIG. 2 is a circuit block diagram showing one example of how wireless circuitry 24 may dynamically allocate/schedule RFE budget for radios 28 based on the data transmission characteristics of each radio. As shown in FIG. 2, wireless circuitry 24 may include RF exposure metric manager 26 coupled to a set of radios 28 over control paths 30. Radios 28 may include, for example, at least a first radio 28-0 that performs cellular (CELL) telephone communications (e.g., voice and/or data communications), a second radio 28-1 that performs Bluetooth (BT) communications, and a third radio 28-2 that performs Wi-Fi communications. This is merely illustrative and, in general, wireless circuitry 24 may include any desired radios that operate according to any desired RAT.

RF exposure metric manager 26 may include an application data classification engine 36, a data prediction engine 42, and an SAR/MPE (e.g., RFE) scheduler 44. The output of application data engine 36 may be coupled to the inputs of data prediction engine 42 and SAR/MPE scheduler 44 over control path 40. The outputs of data prediction engine 42 and SAR/MPE scheduler 44 may be coupled to each radio 28 over control paths 30. Application data classification engine 36 may have inputs that receive application data DAT from one or more software applications 38 for wireless transmission using one or more radios 28. Applications 38 may also provide application data DAT (sometimes referred to herein as transmit data DAT or simply as data DAT) to one or more radios 28 for transmission (e.g., to baseband circuitry in the radio(s) for modulation onto a transmit signal and upconversion to radio frequencies prior to transmission by one or more antennas 34 of FIG. 1). The data DAT provided to application data classification engine 36 may be the same data provided to radios 28 for transmission or may be information about and/or characterizing the data provided to radios 28 for transmission.

Application data classification engine 36, data prediction engine 42, and SAR/MPE scheduler 44 may be implemented using hardware (e.g., one or more digital logic gates, one or more processors, storage circuitry, etc.) and/or software (e.g., stored code executed by one or more processors). Applications 38, application data classification engine 36, data prediction engine 42, and SAR/MPE scheduler 44 may, for example, operate on an application layer of control circuitry 14 of FIG. 1. Application data classification engine 36 may sometimes be referred to herein as application data classifier 36, application data classification block 36, or application data classification circuitry 36. Data prediction engine 42 may sometimes be referred to herein as data predictor 42, data prediction block 42, or data prediction circuitry 42. SAR/MPE scheduler 44 may sometimes be referred to herein as SAR/MPE (RFE) scheduling/budgeting engine 44, SAR/MPE (RFE) scheduling/budgeting block 44, or SAR/MPE (RFE) scheduling/budgeting circuitry 44.

Application data classification engine 36 may generate classification information CLI based on the data DAT received from application(s) 38. Classification information CLI may include information identifying one or more characteristics of data DAT relevant to the RFE that will be consumed in transmitting data DAT. Application data classification engine 36 may transmit classification information CLI to data prediction engine 42 and SAR/MPE scheduler 44 over control path 40. Data prediction engine 42 may generate a data prediction PRED for each radio 28 based on classification information CLI (e.g., a first data prediction PRED0 for radio 28-0, a second data prediction PRED1 for radio 28-1, a third data prediction PRED2 for radio 28-2, etc.). Each data prediction PRED may identify or include a per-radio transmit data prediction for the corresponding radio (e.g., information indicative of or characterizing the transmit data predicted for the radio for a given period in the future). At the same time, SAR/MPE scheduler 44 may generate RF exposure budgets BGT for radios 28 based on classification information CLI and optionally based on sensor data SENSDAT. Data prediction engine 42 may transmit data predictions PRED and SAR/MPE scheduler 44 may transmit RF exposure budgets BGT to the corresponding radios 28 over control paths 30.

One or more sensors 46 may generate (e.g., measure, gather, compute, identify, etc.) sensor data SENSDAT and may provide sensor data SENSDAT to SAR/MPE scheduler 44 and/or data prediction engine 42. Sensor(s) 46 (e.g., one or more sensors in input/output devices 22 of FIG. 1) may include, for example, motion and/or orientation sensors (e.g., an accelerometer, gyroscope, compass, inertial measurement unit, etc.), image sensors, light sensors, touch sensors, proximity sensors, or any other desired sensors. Sensor data SENSDAT may therefore include motion sensor data, orientation sensor data, image sensor data, light sensor data, touch sensor data, proximity sensor data, etc. Additionally or alternatively, sensor(s) 46 may include wireless (e.g., radio-frequency) sensors that measure one or more characteristics of the radio-frequency signals and/or wireless data transmitted and/or received by wireless circuitry 24. For example, sensor(s) 46 may measure (e.g., gather, identify, compute, calculate, generate, produce, etc.) wireless performance metric data associated with the transmission and/or reception of wireless signals (e.g., wireless performance metric data in sensor data SENSDAT). The wireless performance metric data may include error rate data (e.g., bit error rate values, block error rate (BLER) values, symbol error rate values, etc.), received power levels, received signal strength indicator values, transmit power levels, signal-to-noise ratio values, information identifying a number of received acknowledgement (ACK) packets and/or negative-acknowledgement (NACK) packets, or other wireless performance metric information.

Figure 3:
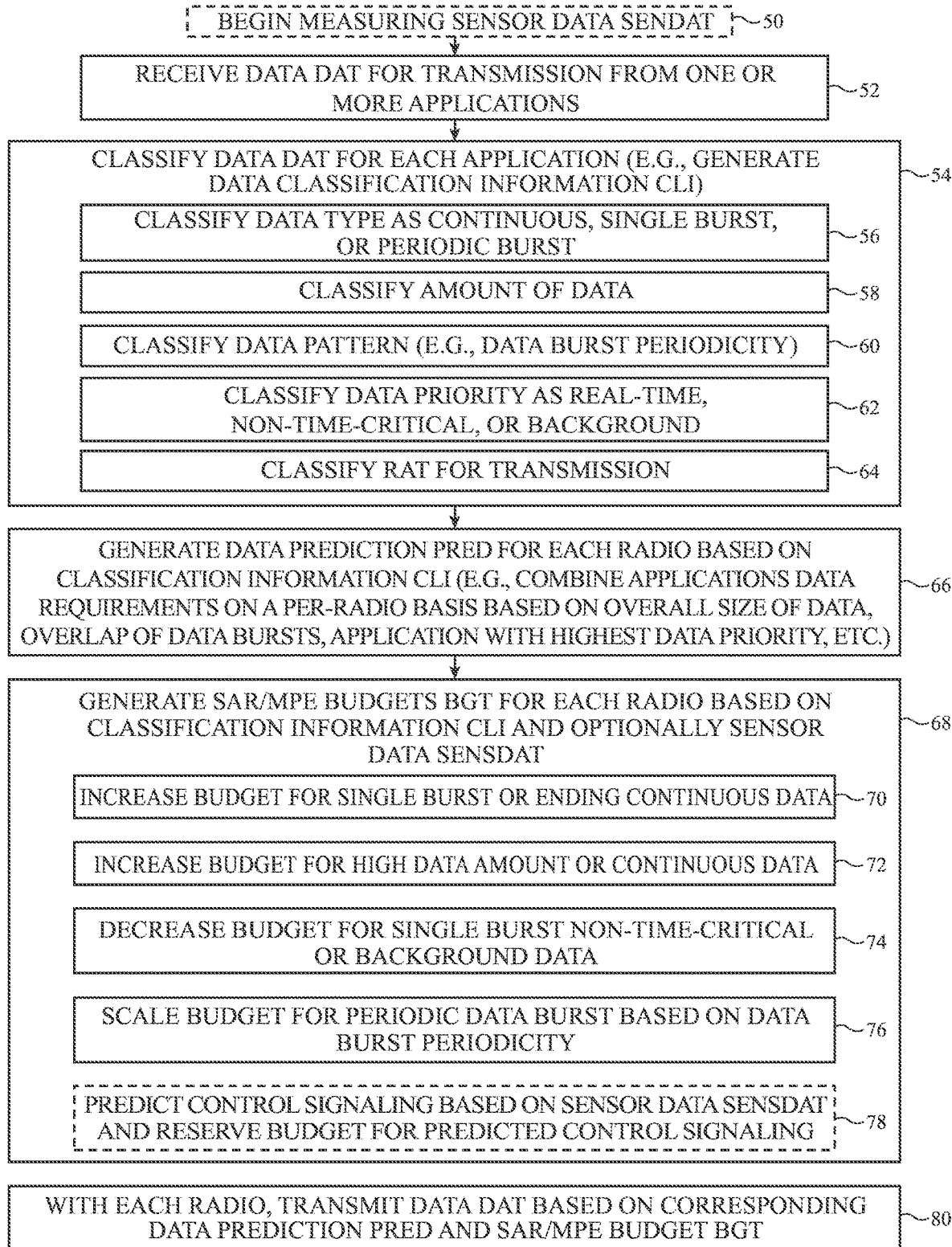
FIG. 3 is a flow chart of illustrative operations involved in using radios to transmit wireless data based on RFE metric budgets and data prediction information in accordance with some embodiments.

FIG. 3 is a flow chart of illustrative operations that may be performed by wireless circuitry 24 to transmit data DAT using one or more radios 28. At optional operation 50, sensor(s) 46 may begin to measure (e.g., generate, capture, estimate, compute, gather, calculate, etc.) sensor data SENSDAT. Sensor(s) 46 may transmit sensor data SENSDAT to SAR/MPE scheduler 44 and/or data prediction engine 42. Operation 50 may be omitted or may be performed concurrently with, before, and/or after operations 54, 56, and 68 of FIG. 3.

At operation 52, application data classification engine 36 may receive data DAT from one or more applications 38. Applications 38 may be running in parallel on device 10. Data DAT may include, for example, wireless data from an email application 38 for transmission using one or more radios 28, wireless data from a web browsing application 38 for transmission using one or more radios 28, wireless data from a voice call from a telephone application 38 for transmission using one or more radios 28, wireless data from a gaming application 38 for transmission using one or more radios 28, wireless data from a messaging application 38 for transmission using one or more radios 28, wireless data from a web-conferencing or video-conferencing application 38 for transmission using one or more radios 28, cloud synchronization data from a cloud-enabled application 38 for transmission using one or more radios 28, or any other data that any desired application 38 running on device 10 needs to wirelessly transmit. Data DAT may additionally or alternatively include information about the wireless data to be transmitted by one or more radios 28.

At operation 54, application data classification engine 36 may classify the data DAT received from each application 38 (e.g., may classify or identify one or more characteristics of data DAT). Application data classification engine 36 may, for example, generate (e.g., produce, compute, calculate, output, etc.) classification information CLI based on the received data DAT. Classification information CLI may include information identifying or predicting one or more characteristics of data DAT relevant to its wireless transmission by radio(s) 28. This information may help control circuitry 14 to understand the ongoing and future (wireless) data activity for each application 38.

For example, application data classification engine 36 may classify the data type of the data DAT received from a given application 38 (at operation 56). The data type reflects the time domain nature of the application data. This may involve classifying (e.g., identifying or predicting) whether data DAT is continuous data, single burst data, or periodic burst data (e.g., whether the pattern of data DAT is continuous, single burst, or periodic burst).

Continuous data (e.g., data DAT that exhibits a continuous data pattern) is a relatively large set of data that the corresponding application 38 needs to be wirelessly transmitted continuously over a relatively long time period such as 10 seconds, 30 seconds, multiple minutes, 10-30 seconds, 5-360 seconds, etc. One example of continuous data is a large file such as a video file that is being uploaded to the internet (e.g., for posting on social media, for storage on a cloud storage network, etc.).

Single burst data (e.g., data DAT that exhibits a single burst data pattern) is a relatively small set of data that the corresponding application 38 needs to be wirelessly transmitted as a one-time event. Examples of single burst data include text messages, email messages, relatively small photo files that are being uploaded to the internet (e.g., for posting on social media, for storage on a cloud storage network, etc.), etc.

Periodic burst data (e.g., data DAT that exhibits a periodic burst data pattern) is a relatively small/medium set of data (e.g., a larger set of data than single burst data and a smaller set of data than continuous data) that needs to be wirelessly transmitted in a bursty manner from time-to-time (e.g., every 10 ms, every 10-100 ms, every 1-1000 ms, every 5-25 ms, etc.). Examples of periodic burst data include voice calls, video calls, audio/video data being livestreamed to the internet, etc.

As another example, application data classification engine 36 may classify (e.g., identify, compute, deduce, etc.) the amount of data DAT received from a given application 38 (at operation 58). This may involve classifying (e.g., identifying or predicting) the size of the data DAT to be wirelessly transmitted, particularly when the data type is continuous or single burst.

If desired, application data classification engine 36 may classify (e.g., identify, predict, compute, deduce, etc.) additional data pattern information such as the burst periodicity of the data DAT received from a given application 38 (at operation 60). The burst periodicity may sometimes also be referred to simply as the data pattern of data DAT. For periodic burst data, the burst periodicity specifies how frequently the bursts occur during transmission (e.g., every 10 ms, every 10-100 ms, every 1-1000 ms, every 5-25 ms, etc.).

If desired, application data classification engine 36 may classify (e.g., identify) the data priority of the data DAT received from a given application 38 (at operation 62). The data priority defines the time-criticality of the data DAT to be wirelessly transmitted. This may involve classifying (e.g., identifying or predicting) whether data DAT has a real-time priority (e.g., whether data DAT is real-time data), a non-time-critical priority (e.g., whether data DAT is non-time-critical data), or a background priority (e.g., whether data DAT is background data).

Real-time data (e.g., data DAT having real-time priority) is the highest priority data. The corresponding application 38 that produces data DAT with real-time priority has a strict latency requirement for transmitted data. Such applications may be applications where any delay in data transmission is likely to be noticed by the user of device 10 (e.g., as reduced voice or video quality, interruptions in service, etc.).

Non-time-critical data (e.g., data DAT having non-time-critical priority) is the second-highest priority data. The corresponding application 38 that produces data DAT with non-time-critical priority is not latency-critical (or less latency critical than real-time data), but the user may still notice when data transfer has been excessively delayed.

Background data (e.g., data DAT having background priority) is the lowest priority data. The corresponding application 38 that produces data DAT with background priority may attempt to transmit data DAT in the background without any user interaction. As such, any delays in the transmission of background data will not be or are highly unlikely to be noticed by the user and are acceptable for the application.

If desired, application data classification engine 36 may classify (e.g., identify) the RAT that will be used to transmit the data DAT received from a given application 38 (at operation 64). The RAT may be cellular, Wi-Fi, BT, UWB, etc.

The classification information CLI produced by application data classification engine 36 may therefore include information identifying (e.g., classifying, characterizing, or predicting) the data type of data DAT (as identified at operation 56), the amount of data DAT (as identified at operation 58), the burst periodicity of data DAT (as identified at operation 60), the priority of data DAT (as identified at operation 62), and/or the RAT to be used for transmission of data DAT (as identified at operation 64) to be transmitted over one or more radios 28 during a particular future time period. One or more of operations 56-64 may be omitted if desired. If desired, application data classification engine 36 may concurrently classify the data DAT received from two or more applications 38 in parallel. As such, classification information CLI may include information identifying the characteristics (classifications) of the data DAT to be concurrently transmitted for two or more applications 38 over one or more radios 28.

At operation 66, data prediction engine 42 may generate a data prediction PRED for each radio 28 (e.g., in parallel) based on classification information CLI. Data prediction PRED may include a prediction of the data pattern and usage for each radio 28 based on the data DAT to be transmitted by application(s) 38. For this purpose, data prediction engine 42 may combine the classification of data DAT from each of the applications 38 in classification information CLI for each RAT to derive a radio-specific data pattern for each radio 28. For each radio 28, data prediction engine 42 may estimate (e.g., predict) the overall amount of data to be transferred by the radio over a defined future time period, may combine the bursty data pattern into a radio-specific burst pattern, and/or may derive the highest data priority across all applications using the radio. Each data prediction PRED may therefore include an estimate (e.g., prediction) of the overall amount of data to be transferred by the corresponding radio over a defined future time period, an estimated or derived (e.g., predicted) radio-specific burst pattern to be used by the corresponding radio (e.g., as produced by combining bursty data patterns in the data DAT from one or more applications 38), and/or information identifying the highest data priority across all applications using the corresponding radio. Each data prediction PRED may also include information identifying the classified data type, the amount (size), and/or the burst periodicity of the data DAT to be transmitted by the corresponding radio 28 and, if desired, may include a prediction of future time instants where the radio link will be active. Data prediction engine 42 may transmit data predictions PRED to the corresponding radios 28 over control paths 30.

Operation 68 may be performed concurrently with operation 66 if desired. At operation 68, SAR/MPE scheduler 44 may generate RF exposure budgets BGT for each radio 28 (e.g., in parallel) based on classification information CLI and optionally sensor data SENSDAT. For example, at operation 70, SAR/MPE scheduler 44 may increase the RF exposure budget BGT for a given radio 28 if classification information CLI indicates that the radio is to transmit single burst or ending continuous data DAT (e.g., as identified at operations 56 and/or 60). This may allow the corresponding radio 28 to have increased RF exposure budget to handle uplink traffic peaks having limited durations such as a duration shorter than a 60/100 s regulatory SAR averaging period or a 4 s regulatory MPE averaging period. In examples where multiple radios 28 are required to transmit single bursts each, the increased RF exposure budget may be applied for some time to allow data to be transmitted quickly, followed by a period with less activity and therefore less RF exposure budget.

If desired, at operation 58, SAR/MPE scheduler 44 may increase the RF exposure budget BGT for the radio if classification information CLI indicates that the radio is to transmit a high amount of data DAT (e.g., as identified at operation 58) or continuous data DAT (e.g., as identified at operation 56). In examples where continuous data transmission is required over a relatively long period (e.g., a duration longer than the 60/100 s regulatory SAR averaging period or the 4 s regulatory MPE averaging period), RF exposure may be equally distributed over time to allow continuous transmission with the same amount of transmit power. Additionally or alternatively, SAR/MPE scheduler 44 may schedule (e.g., allocate, assign, provide, etc.) more RF exposure budget to radios with real-time priority (e.g., as identified at operation 62) to ensure that the transmission of latency-critical data does not suffer from RF exposure limitations.

On the other hand, at operation 74, SAR/MPE scheduler 44 may decrease the RF exposure budget BGT for the radio if classification information CLI indicates that the radio is to transmit single burst non-time-critical data DAT or background data DAT (e.g., as identified at operations 56 and/or 62). For example, SAR/MPE scheduler 44 may provide less RF exposure budget to radios that only have background priority because slower or delayed transmission of background traffic does not harm the user experience.

If desired, SAR/MPE scheduler 44 may scale the RF exposure budget BGT for the radio if classification information CLI indicates that the radio is to transmit periodic burst data DAT (e.g., as identified at operation 56), where the scaling is performed based on the data burst periodicity of the periodic burst data DAT (e.g., as identified at operation 60). More budget may be provided for periodic burst data DAT having higher burst periodicities than for periodic burst data DAT having lower burst periodicities, for example. SAR/MPE scheduler 44 may, for example, provide more RF exposure budget for radios with continuous data but less RF exposure budget for radios with burst data, since burst data generally does not produce much RF exposure. For radios with periodic data bursts, the SAR/MPE scheduler 44 and the radios may perform time domain alignment of data burst occurrence and RF exposure assignment. These radios may need RF exposure budget during the bursts while requiring less RF exposure budget between two burst occasions.

At optional operation 78, SAR/MPE scheduler 44 may predict the control signaling required for each radio 28 based on sensor data SENSDAT. The control signaling involves transmission and/or reception of wireless control signals (e.g., control channel signals, reference signals, synchronization signals, sounding signals, and/or any other signals that do not include data DAT) between device 10 and a wireless base station, access point, or other external communications equipment for use in controlling the transmission of wireless data (e.g., data DAT) over-the-air. SAR/MPE scheduler 44 may then reserve a portion of the corresponding RF exposure budget BGT to accommodate the predicted control signaling. For example, more RF exposure budget BGT may be reserved (e.g., less RF exposure budget may be allocated to transmitted data DAT) when a relatively high amount of control signaling is predicted, whereas less RF exposure budget BGT is reserved (e.g., more RF exposure budget is allocated to transmitted data DAT) when a relatively low amount of control signaling is predicted. SAR/MPE scheduler 44 may transmit RF exposure budgets BGT to the corresponding radios 28 over control paths 30. One or more of operations 70-78 may be omitted if desired.

In this way, SAR/MPE scheduler 44 may control the RF exposure allowed for device 10 in the time domain while splitting the allowed RF exposure between radios 28 and the corresponding RATs. At the same time, classification information CLI may help to optimize this distribution between radios 28 and to optimize the RF exposure consumption in the time domain. At operation 80, each radio 28 may receive its corresponding data prediction PRED from data prediction engine 42 and its corresponding RF exposure budget BGT from SAR/MPE scheduler 44. Each radio 28 may then transmit the corresponding data DAT (e.g., from one or more applications 38) based on its data prediction PRED and its RF exposure budget BGT. In general, uplink transmission by radios 28 is governed by the base station or gNB. For example, the transmitters in radios 28 are limited by the uplink grants scheduled by the network. If desired, a given radio 28 may adjust its scheduled uplink grant based on its data prediction PRED and its RF exposure budget BGT (e.g., via Buffer Status and Uplink Power Headroom Reports such that the uplink grants match data prediction PRED and RF exposure budget BGT).

Besides overall device RF exposure, each radio 28 may use its classified and predicted application data (e.g., as identified by its data prediction PRED) to optimize RF exposure consumption over time. The RF exposure consumption may sometimes also be referred to herein as RF exposure production (e.g., the RF exposure produced by the radio(s) while transmitting signals), SAR/MPE consumption, or SAR/MPE production. The RF exposure consumption may include SAR consumption (production) and/or MPE consumption (production), depending on the frequencies handled by the corresponding radio. The amount of RF exposure that a given radio 28 can consume is a subset of the overall device RF exposure budget (e.g., a so-called radio-specific RF exposure budget). The radio-specific RF exposure budget may include a corresponding SAR budget and/or a corresponding MPE budget that the radio can consume over a particular time period referred to herein as a consumption period. The radio may consider the data prediction and the available amount of its RF exposure budget to perform time-domain scheduling of RF exposure consumption over the consumption period.

Figure 4:
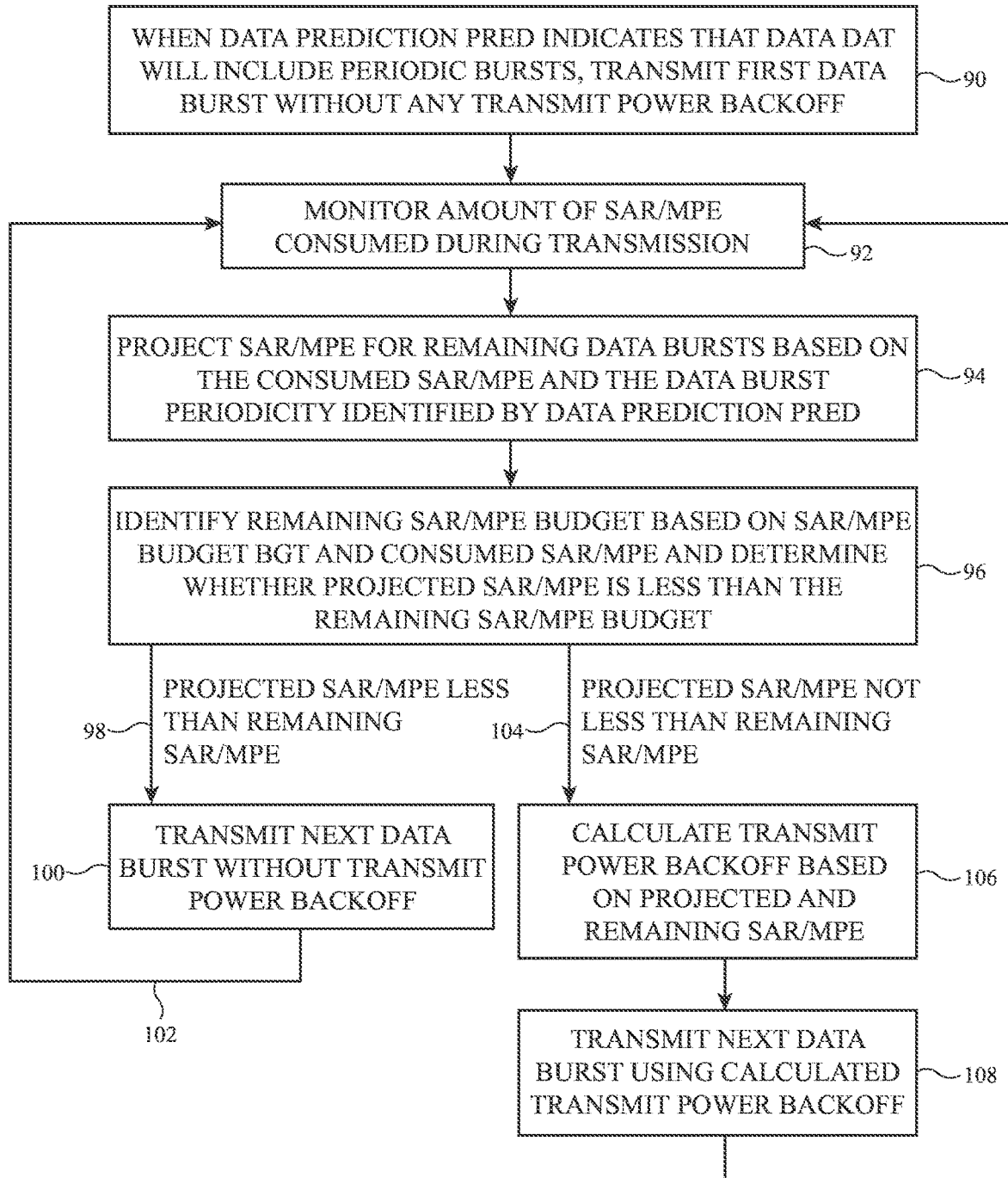
FIG. 4 is a flow chart of illustrative operations that may be performed by a radio to transmit periodic bursts of wireless data based on a corresponding RFE metric budget and data prediction information in accordance with some embodiments.

FIG. 4 is a flow chart of illustrative operations that may be performed by a given radio 28 when its corresponding data prediction PRED indicates that the data DAT to be transmitted by that radio is periodic burst data. The operations of FIG. 4 may, for example, be performed by one radio 28 while processing operation 80 of FIG. 3.

Periodic data bursts result in bursty RF exposure consumption. The resulting overall RF exposure is usually below regulatory limits, as transmit periods are interleaved with periods with no transmission. On the other hand, transmit occasions will cause high instantaneous RF exposure consumption (sometimes referred to herein simply as RF exposure) that may exceed regulatory limits for short periods of time. The operations of FIG. 4 may allow radio 28 to avoid unnecessary reductions in maximum transmit power level (sometimes referred to herein as transmit power backoffs).

At operation 90, when the data prediction PRED for radio 28 indicates that the data DAT to be transmitted by the radio is periodic burst data, radio 28 may transmit a first data burst from data DAT without performing any back off in maximum transmit power level (e.g., without performing any transmit power backoffs) and/or without performing any reduction in transmit power level.

At operation 92, wireless circuitry 24 may monitor (e.g., actively measure, calculate, compute, deduce, etc.) the amount of RF exposure (e.g., SAR and/or MPE) consumed by transmission of the first data burst from data DAT. The RF exposure consumed (sometimes referred to herein as consumed RF exposure) may be monitored by circuitry on radio 28, by control circuitry 14, and/or by sensor(s) 46 of FIG. 2.

At operation 94, radio 28 may project (e.g., estimate or predict) the RF exposure that will be consumed by the remaining data bursts in data DAT (e.g., for the remainder of the consumption period) based on the RF exposure consumed by the transmission of the first data burst and the data burst periodicity identified by the corresponding data prediction PRED for radio 28. This projected RF exposure may include projected SAR and/or projected MPE. The consumption period may be identified by the corresponding RF exposure budget BGT for radio 28. The projected RF exposure may be determined by multiplying the RF exposure consumed by the first burst by the number of remaining bursts in data DAT within the consumption period, for example.

At operation 96, radio 28 may identify the amount of remaining RF exposure budget based on the consumed RF exposure (e.g., by subtracting the consumed RF exposure from the corresponding RF exposure budget BGT, not including any control signaling reservation in RF exposure budget BGT). Radio 28 and/or control circuitry 14 may then determine whether the projected RF exposure is less than the remaining RF exposure budget. The remaining RF exposure budget may sometimes also be referred to herein simply as the remaining RF exposure. If the projected RF exposure is less than the remaining RF exposure budget, processing may proceed to operation 100 via path 98.

At operation 100, radio 28 may transmit the next first data burst from data DAT without performing any back off in maximum transmit power level (e.g., without performing any transmit power backoffs) and/or without performing any reduction in transmit power level. Processing may then loop back to operation 92 via path 102. Once the projected RF exposure is greater than or equal to the remaining RF exposure budget, processing may proceed from operation 96 to operation 106 via path 104.

At operation 106, radio 28 may calculate a transmit power backoff based on the projected RF exposure and the remaining RF exposure budget. For example, greater transmit power backoffs may be used for greater projected RF exposures and/or lower remaining RF exposure budgets and lesser transmit power backoffs may be used for lower projected RF exposures and/or higher remaining RF exposure budgets.

At operation 108, radio 28 may transmit the next data burst from data DAT using the calculated transmit power backoff. Processing may then loop back to operation 92 via path 110 (e.g., until the end of the consumption period, at which point processing may jump back to operation 90). In this way, radio 28 may ensure that the available RF exposure budget is well utilized, attempting to consume the RF exposure budget during transmit occasions without sacrificing wireless performance by performing unnecessary transmit power backoffs. As one example, data DAT may include voice/video calls with connected mode DRX (CDRX). In this example, data DAT is bursty and causes bursty RF exposure. Radio 28 may thus spend all of its RF exposure budget during its DRX ON periods while no RF exposure is consumed during DRX OFF periods.

Figure 5:
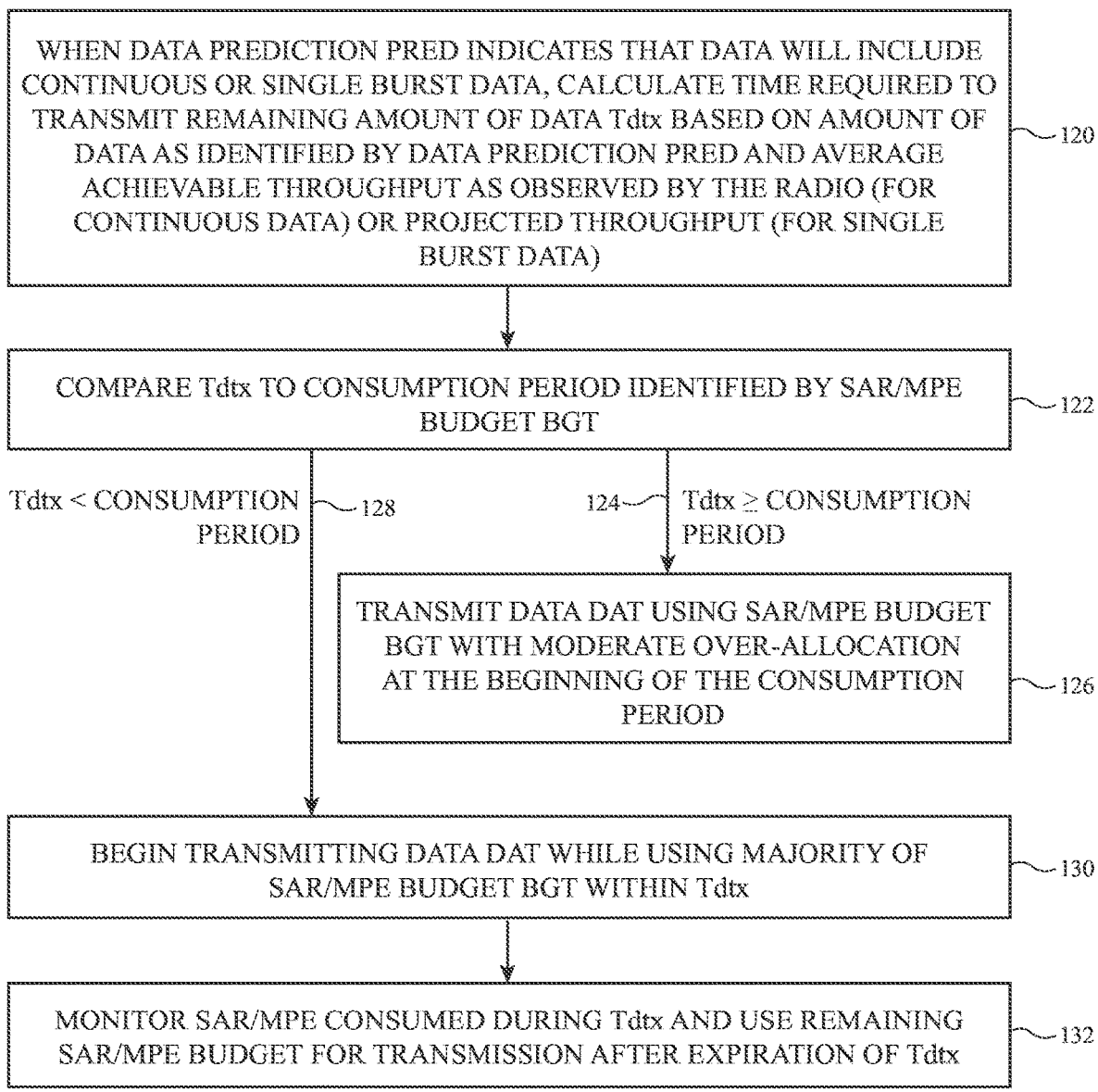
FIG. 5 is a flow chart of illustrative operations that may be performed by a radio to transmit continuous or single burst wireless data based on a corresponding RFE metric budget and data prediction information in accordance with some embodiments.

FIG. 5 is a flow chart of illustrative operations that may be performed by a given radio 28 when its corresponding data prediction PRED indicates that the data DAT to be transmitted by that radio is continuous data or single burst data. The operations of FIG. 5 may, for example, be performed by one radio 28 while processing operation 80 of FIG. 3.

For continuous data or single data bursts, radio 28 may transmit all the data as fast as possible without any delays. This may require a high transmit power level and UL duty cycle, which results in high instantaneous RF exposure. For this purpose, radio 28 may first determine whether all the remaining data DAT can be transmitted within the current consumption period.

For example, at operation 120, when the data prediction PRED for radio 28 indicates that the data DAT to be transmitted by the radio is continuous data or single burst data, radio 28 may generate (e.g., calculate, compute, produce, or estimate) the time required to transmit the remaining amount of data in data DAT, referred to herein as remaining data transmission duration Tdtx. When data DAT includes single burst data, radio 28 may project the UL throughput for the single burst (e.g., based on the corresponding data prediction PRED) and may generate remaining data transmission duration Tdtx based on the size of the data in the single burst (e.g., as identified by data prediction PRED) and the projected UL throughput. Radio 28 may generate remaining data transmission duration Tdtx by dividing the size of the data in the single burst by the projected UL throughput, for example. When data DAT includes continuous data, radio 28 may identify an average achievable UL throughput (e.g., as observed by the radio for one or more previous transmissions or as derived based on device configuration and channel conditions) and may generate remaining data transmission duration Tdtx based on the amount/size of the data (e.g., as identified by data prediction PRED) and the average achievable UL throughput. Radio 28 may generate remaining data transmission duration Tdtx by dividing the size of the data by the average achievable UL throughput, for example.

At operation 122, radio 28 may compare remaining data transmission duration Tdtx to the duration of the consumption period identified by its RF exposure budget BGT to determine whether the remaining data transmission duration Tdtx exceeds the duration of the consumption period. If remaining data transmission duration Tdtx exceeds (e.g., is greater than or equal to) the duration of the consumption period, radio 28 cannot transmit all of its data DAT within the consumption period while satisfying RF exposure requirements, and processing may proceed to operation 126 via path 124. At operation 126, radio 28 may transmit data DAT using its RF exposure budget BGT distributed approximately equally over the consumption period. If desired, radio 28 may transmit data DAT using its RF exposure budget BGT with a moderate over-allocation of RF exposure budget at the beginning of the consumption period.

If remaining data transmission duration Tdtx is less than (e.g., does not exceed) the duration of the consumption period, radio 28 is able to transmit all of its data DAT within a sub-duration of the consumption period and processing may proceed from operation 122 to operation 130 via path

128. At operation 130, radio 28 may begin transmitting its data DAT while using a majority of its RF exposure budget within remaining data transmission duration Tdtx. Transmitting all or nearly all of data DAT during remaining data transmission duration Tdtx may ensure that the data is transmitted with minimal latency. There might also be a need to reserve some RF exposure budget for control signaling (e.g., as predicted at operation 78 of FIG. 3) and/or unforeseen transmit operations after the expiry of remaining data transmission duration Tdtx.

At operation 132, radio 28 may monitor the consumed RF exposure from the transmission of data DAT. Radio 28 may transmit data DAT without transmit power backoff unless and until it detects that the RF exposure budget is not sufficient to transmit with maximum transmit power over the remaining data transmission duration Tdtx.

In this way, radio 28 may transmit continuous or single burst data without sacrificing wireless performance and while ensuring that RF exposure regulations are satisfied. Consider one example in which data DAT includes single data bursts for the transmission of small message(s) or email(s). In these examples, the single data bursts may be transmitted completely within around 5-500 ms. Radio 28 may spend more RF exposure budget during this duration (e.g., remaining data transmission duration Tdtx) and less RF exposure budget after message transmission. Consider another example in which data DAT continuous data for transmission of a large file upload. In this example, radio 28 may spend its RF exposure budget equally distributed over time.

Consider yet another example in which data DAT includes a first set of continuous data transmitted for a first application 38 and a second set of periodic burst data concurrently transmitted for a second application 38. From an RF exposure perspective, the radio may spend a first part of the RF exposure budget equally distributed over time and may spend a second part of the RF exposure budget to boost RF exposure for short time periods to ensure transmission of the periodic data bursts for the second application 38.

If desired, wireless circuitry 24 may apply machine learning in addition to considering the application input for planning RF exposure consumption in the time domain. For example, radio 28 may use a machine learning algorithm to learn data pattern characteristics and to use the characteristics to project future data transmissions. This in turn can be used for time domain planning of RF exposure consumption. Machine learning-based RF exposure projection and application-based inputs may also coexist using and inputs from both may be combined for RF exposure time domain scheduling if desired.

In parallel with transmitting application data DAT, each radio 28 also needs to transmit control-related data (e.g., control signals) for the purpose of maintaining its connection with external communications equipment (e.g., a wireless base station or access point) and to acknowledge the reception of downlink (DL) data packets from the external communications equipment. As such, each radio 28 needs to consume some of its RF exposure budget BGT for control signaling. Consider one example where device 10 has reported to the network measurements in which the serving cell reference signal received power (RSRP) has become low and a target cell RSRP has become strong. In this case, there is a sizable amount of control signaling expected in the near future (e.g., as related to an imminent handover between the serving cell and the target cell), which should be accounted for. If desired, RF exposure metric manager 26 may generate RF exposure budgets BGT that account for this control signaling (e.g., thereby operating as a predictor of both control plane traffic and data plane traffic).

Figure 6:
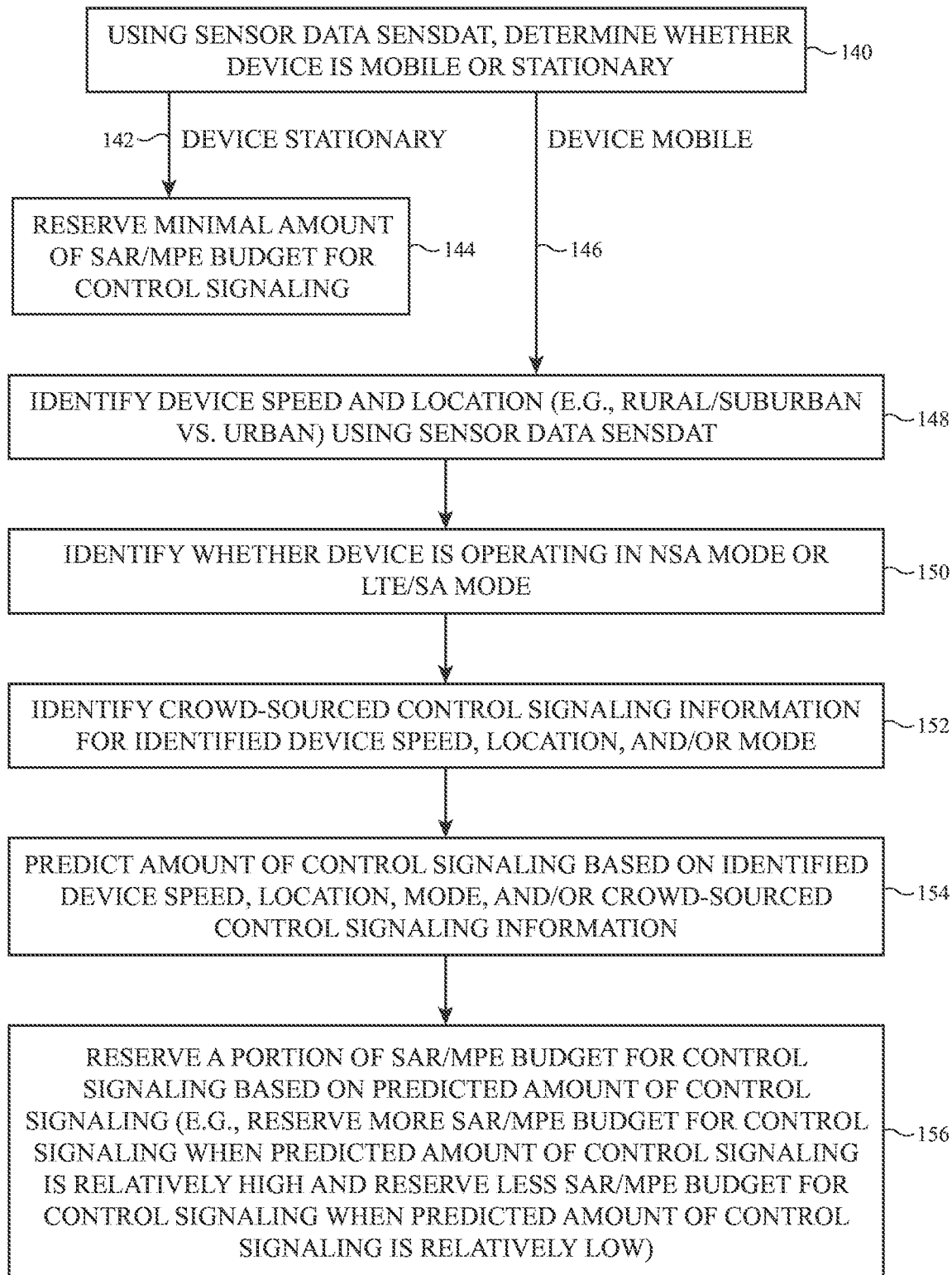
FIG. 6 is a flow chart of illustrative operations that may be performed by wireless circuitry to generate an RFE metric budget having a control signaling reservation in accordance with some embodiments.

FIG. 6 is a flow chart of illustrative operations that may be performed by RF exposure metric manager 26 to generate an RF exposure budget BGT for a given radio 28 that accounts for control signaling to be performed by radios 28. RF exposure metric manager 26 may account for control signaling by generating RF exposure budget BGT to include an RF exposure reservation for the predicted control signaling to be used by radio 28. The operations of FIG. 6 may, for example, be performed while processing operation 78 of FIG. 3.

At operation 140, SAR/MPE scheduler 44 may process the sensor data SENSDAT produced by sensor(s) 46 (FIG. 2) to determine whether device 10 is mobile or stationary. In general, the amount of control signaling required by device 10 may depend on the mobility state of device 10. Sensor data SENSDAT may include, for example, motion sensor data, GPS data or other satellite navigation data, or any other data indicative of the motion of device 10. When sensor data SENSDAT indicates that device 10 is stationary, processing may proceed to operation 144 via path 142.

At operation 144, SAR/MPE scheduler 44 may generate or update the RF exposure budget BGT for radio 28 that reserves a minimal amount of the RF exposure budget for use in control signaling (e.g., RF exposure budget BGT may include a minimal control signaling reservation). When device 10 is in a static condition (e.g., is stationary), communications usually do not need to be reconfigured with the external communications equipment. For example, device 10 is generally not required to perform measurement reporting to report updated serving and neighbor cell measurements to a wireless base station and is not required to perform the control operations associated with cell handover while stationary. As such, the amount of reserved RF exposure can be limited to a bare minimum when device 10 is static. When sensor data SENSDAT indicates that device 10 is not stationary (e.g., that device 10 is mobile or moving), processing may proceed from operation 140 to operation 148 via path 146.

At operation 148, SAR/MPE scheduler 44 may process sensor data SENSDAT to determine (e.g., identify, detect, calculate, etc.) the speed and/or location of device 10. If desired, SAR/MPE scheduler 44 may identify the location of device 10 as either rural/suburban or urban. Speed and location may be determined from a motion sensor on device 10, the GPS location of device 10, or any other desired sensors on device 10.

At operation 150, SAR/MPE scheduler 44 may identify whether wireless circuitry 24 is operating in a non-standalone (NSA) mode or an LTE/standalone (SA) mode. In the NSA mode, wireless circuitry 24 can communicate with dual connectivity that concurrently uses both a 5G RAT and an earlier RAT such as a 4G, 3G, or 2G RAT (e.g., using the earlier RAT as an anchor RAT for control signaling and/or other purposes). In the LTE/SA mode, wireless circuitry 24 communicates without dual connectivity using only the 5G RAT or using only the 4G RAT (e.g., LTE). The NSA mode and the LTE/SA mode may involve different amounts of control signaling that should be accounted for in generating RF exposure budget BGT.

At operation 152, SAR/MPE scheduler 44 may identify or receive crowd-sourced control signaling information. The crowd-sourced control signaling information may include crowd-sourced data and/or data produced by a machine learning algorithm estimating the number of control signal messages expected to be used by a device having the same speed, location, and/or mode (e.g., NSA mode or LTE/SA mode) as device 10. Device 10 may receive the crowd-sourced data from one or more other devices and/or from a server in communication with device 10 (e.g., periodically, upon software update, upon start up, on demand, etc.). One or more of operations 148-152 may be omitted if desired. Operations 148-152 may be performed concurrently and/or in other orders.

At operation 154, SAR/MPE scheduler 44 may predict the amount of control signaling to be used by radio 28 for a set future period based on the identified device speed, location (e.g., whether device 10 is in a rural/suburban area or in an urban area), mode (e.g., whether device 10 is in an NSA mode or LTE/SA mode), and/or the crowd-sourced control signaling information.

At operation 156, SAR/MPE scheduler 44 may generate or update RF exposure budget BGT to include a control signaling reservation based on the predicted amount of control signaling. The control signal reservation may include an amount of RF exposure that is reserved for control signaling purposes and that is not to be used for transmitting data DAT (e.g., during the operations of FIGS. 4 and 5). As an example, a relatively large amount of the RF exposure budget may be reserved for control signaling (e.g., the control signaling reservation may be relatively large) when the predicted amount of control signaling is relatively high and a relatively low amount of the RF exposure budget may be reserved for control signaling (e.g., the control signal reservation may be relatively small) when the predicted amount of control signaling is relatively low. In this way, SAR/MPE scheduler 44 may ensure that radio 28 always has sufficient RF exposure budget to transmit control signaling (e.g., reference signals, acknowledgement (ACK) packets, synchronization signals, channel control signals, measurement reports, channel state information, etc.).

Figure 7:
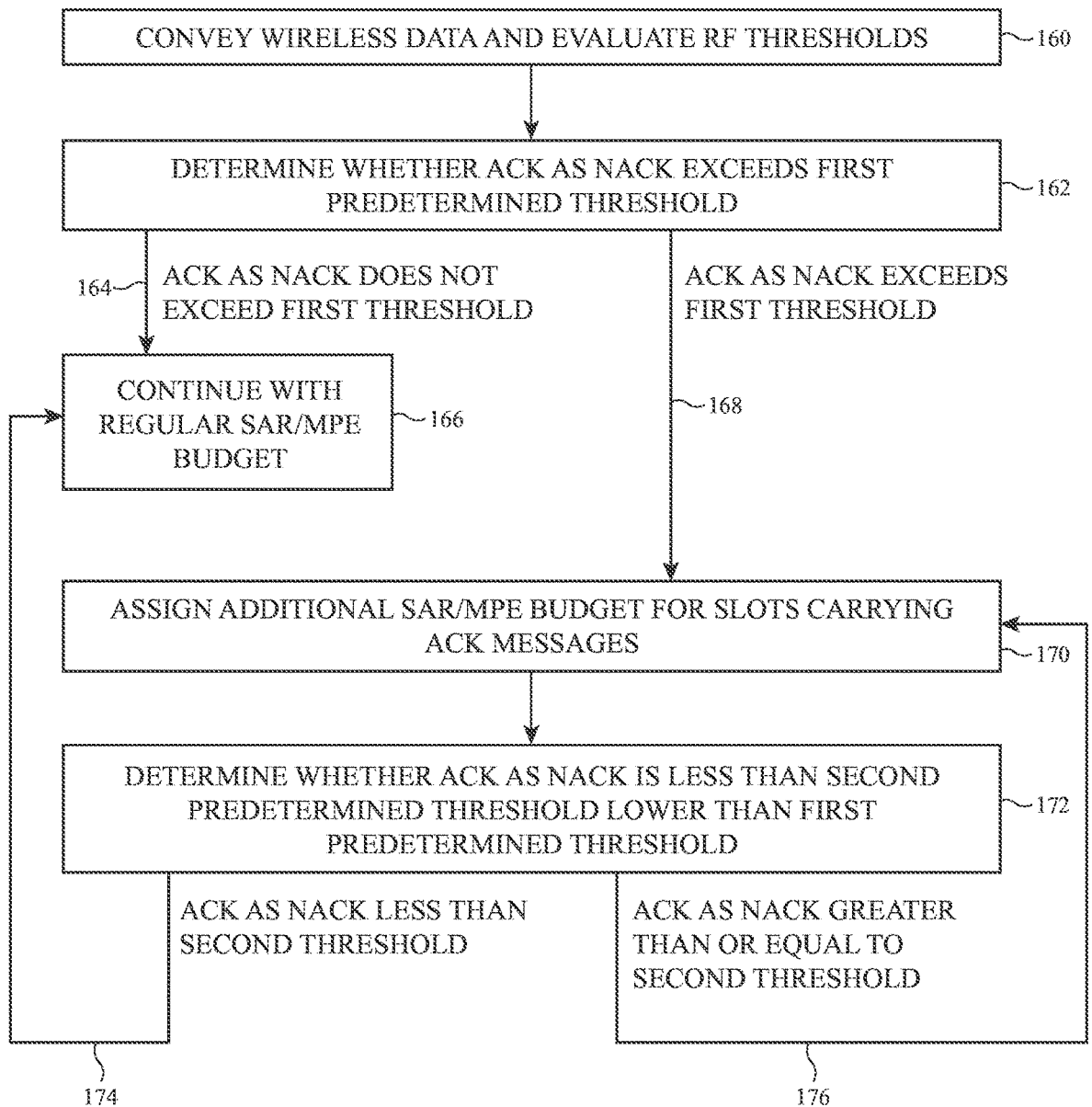
FIG. 7 is a flow chart of illustrative operations that may be performed by wireless circuitry to update an RFE metric budget based on receipt of data acknowledgements in accordance with some embodiments.

If desired, SAR/MPE scheduler 44 may generate or update RF exposure budget BGT to temporarily boost the amount of the budget reserved for control signaling (e.g., to boost the size of the control signaling reservation) based on one or more radio-frequency (wireless) performance metrics monitored by wireless circuitry 24 (e.g., by a receiver in sensor(s) 46 of FIG. 2). FIG. 7 is a flow chart of illustrative operations that may be performed by SAR/MPE scheduler 44 to generate or update RF exposure budget BGT for a given radio 28 based on an ACK as NACK performance metric. The operations of FIG. 7 may be performed while processing operation 78 of FIG. 3 and/or one or more of the operations of FIG. 6.

At operation 160, radio 28 may transmit wireless data. Radio 28 may gather wireless performance metric data from the transmitted wireless data. If desired, radio 28 may compare the wireless performance metric data to one or more radio-frequency (RF) thresholds. When device 10 is in weak RF conditions, the radio requires a high transmit power to reach the base station or access point. When device 10 is at the edge of the coverage area of the base station or access point, transmissions may fail where the base station or access point do not properly receive the device transmission and do not acknowledge reception. When the base station or access point successfully receives an uplink packet from device 10, the base station or access point may transmit a downlink acknowledgement (ACK) packet to device 10. When the base station or access point does not receive the uplink packet, the base station or access point may transmit a downlink negative-acknowledgement (NACK) packet to device 10. Radio 28 may receive ACK packets and NACK packets while transmitting the wireless data. SAR/MPE scheduler 44 may track the ACK and NACK packets received by radio 28.

At operation 162, SAR/MPE scheduler 44 may determine (e.g., generate, identify, calculate, compute, etc.) the ACK as NACK of radio 28 (sometimes referred to herein as the negative-acknowledgement rate or NACK rate of radio 28) by dividing the number of NACK packets received by radio 28 by the sum of the number of NACK and ACK packets received by radio 28. SAR/MPE scheduler 44 may compare the ACK as NACK (NACK rate) of radio 28 to a first predetermined threshold value (e.g., 5%, 1-10%, 3-8%, or another threshold value). If the ACK as NACK (NACK rate) does not exceed (e.g., is less than) the first threshold value, processing may proceed to operation 166 via path 164.

At operation 166, SAR/MPE scheduler 44 may control radio 28 to continue to use its regular (e.g., its existing or current) RF exposure budget BGT (e.g., without temporarily boosting the control signaling reservation in the RF exposure budget). If the ACK as NACK (NACK rate) exceeds (e.g., is greater than or equal to) the first threshold value, processing may proceed from operation 162 to operation 170 via path 168.

At operation 170, SAR/MPE scheduler 44 may increase or boost the amount of the RF exposure budget BGT reserved for control signaling (e.g., SAR/MPE scheduler 44 may boost or increase the size of the control signaling reservation). As an example, SAR/MPE scheduler 44 may assign/reserve additional RF exposure budget for slots carrying ACK messages. This may allow increased transmit power for control blocks resulting in lower NACK rates. Radio 28 may then continue to convey wireless data using the new or updated RF exposure budget BGT having the boosted control signaling reservation.

At operation 172, SAR/MPE scheduler 44 may determine whether the ACK as NACK (NACK rate) has fallen below a second predetermined threshold value that is lower than the first threshold value (e.g., 2%). If the ACK as NACK (NACK rate) is less than the second threshold value, processing may loop back to operation 166 via path 174 and radio 28 may continue to convey wireless data with its regular RF exposure budget BGT (e.g., without the boosted control signaling reservation). If the ACK as NACK (NACK rate) is greater than or equal to the second threshold value, processing may loop back to operation 170 via path 176 to further boost the control signaling reservation until the NACK rate is sufficiently low.

Figure 8:
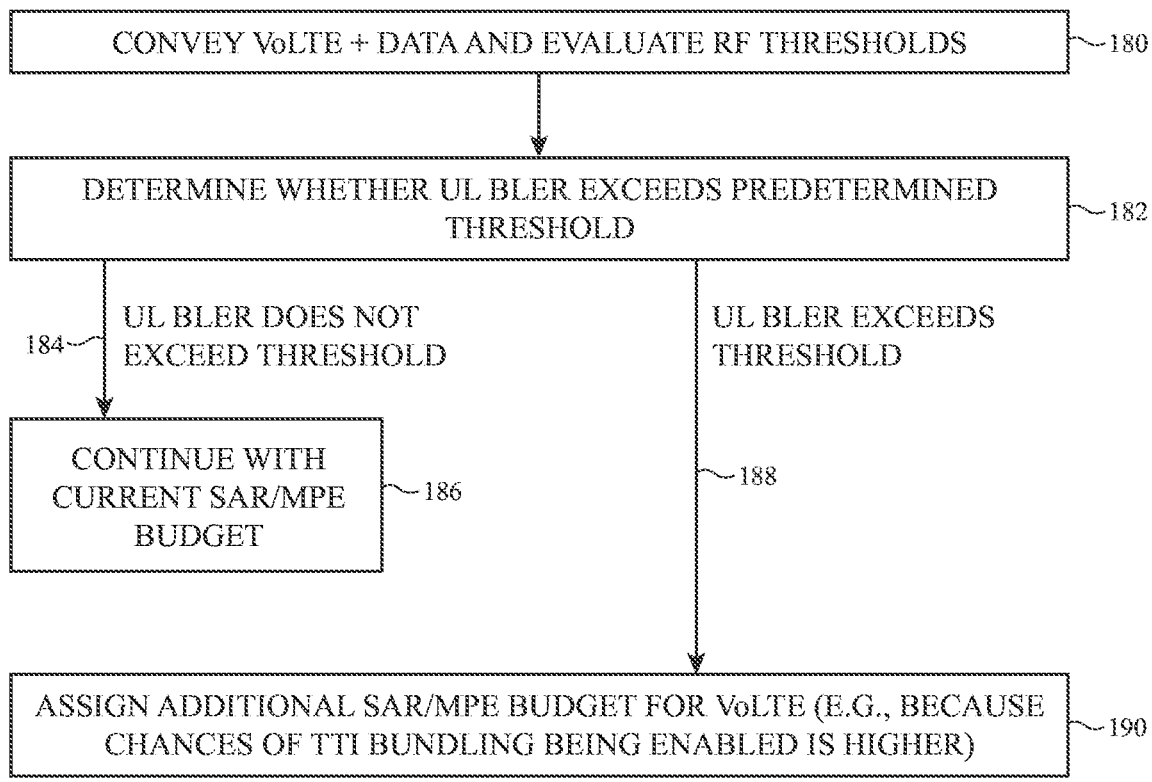
FIG. 8 is a flow chart of illustrative operations that may be performed by wireless circuitry to update an RFE metric budget based on uplink block error rate measurements in accordance with some embodiments.

FIG. 8 is a flow chart of illustrative operations that may be performed by SAR/MPE scheduler 44 to generate or update RF exposure budget BGT for a given radio 28 based on an uplink block error rate (UL BLER) performance metric. The operations of FIG. 8 may be performed while processing operation 78 of FIG. 3 and/or one or more of the operations of FIG. 6.

At operation 180, radio 28 may transmit voice-over-LTE (VoLTE) and Data. Radio 28 may gather wireless performance metric data from the transmitted VoLTE and Data. If desired, radio 28 may compare the wireless performance metric data to one or more radio-frequency (RF) thresholds. When the RF conditions are poor, radio 28 may generate relatively high UL BLER values.

At operation 182, SAR/MPE scheduler 44 may determine (e.g., generate, identify, calculate, compute, etc.) the UL BLER of radio 28. SAR/MPE scheduler 44 may compare the UL BLER to a predetermined threshold value. If the UL BLER does not exceed (e.g., is less than) the first threshold value, processing may proceed to operation 186 via path 184. At operation 186, SAR/MPE scheduler 44 may control radio 28 to continue to use its regular (e.g., its existing or current) RF exposure budget BGT (e.g., without temporarily boosting the control signaling reservation in the RF exposure budget and without enabling TTI bundling). TTI bundling is defined by the LTE specification and may serve to improve coverage at the edge of the cell of a wireless base station.

If the UL BLER exceeds (e.g., is greater than or equal to) the threshold value, processing may proceed from operation 182 to operation 190 via path 188. At operation 190, SAR/MPE scheduler 44 may increase or boost the amount of the RF exposure budget BGT reserved for VoLTE, as the chance of TTI bundling becoming enable is higher with boosted power.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods and operations described above in connection with FIGS. 1-8 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 16 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry 18 of FIG. 1, etc.). The processing circuitry may include microprocessors, central processing units (CPUs), application-specific integrated circuits with processing circuitry, or other processing circuitry. The regulatory SAR limit, MPE limit, and averaging times described herein need not be imposed by a government or regulatory body and may additionally or alternatively be imposed by a network operator, base station, or access point of a wireless network in which device 10 operates, by device 10 itself, by the manufacturer or designer of some or all of device 10, by wireless industry standards, protocols, or practices, by software running on device 10, etc.

For one or more aspects, at least one of the components set forth in one or more of the preceding figures may be configured to perform one or more operations, techniques, processes, or methods as set forth in the example section below.

EXAMPLES

In the following sections, further exemplary aspects are provided.

Example 1 includes an electronic device comprising: one or more antennas; a radio communicably coupled to the one or more antennas; and one or more processors configured to predict a data type of wireless data to be transmitted for an application executed by the one or more processors, and generate a radio-frequency exposure (RFE) budget for the radio based on the predicted data type, the radio being configured to transmit the wireless data according to the RFE budget using the one or more antennas.

Example 2 includes the electronic device of example 1 or some other example or combination of examples herein, wherein the one or more processors is further configured to: predict a size of the wireless data to be transmitted for the application; and generate the RFE budget for the radio based on the predicted size of the wireless data.

Example 3 includes the electronic device of examples 1 or 2 or some other example or combination of examples herein, wherein the one or more processors is further configured to: predict a burst periodicity of the wireless data to be transmitted for the application; and generate the RFE budget for the radio based on the predicted burst periodicity of the wireless data.

Example 4 includes the electronic device of any one of examples 1-3 or some other example or combination of examples herein, wherein the one or more processors is further configured to: predict a priority of the wireless data to be transmitted for the application; and generate the RFE budget for the radio based on the predicted priority of the wireless data.

Example 5 includes the electronic device of any one of examples 1-4 or some other example or combination of examples herein, wherein the one or more processors is configured to predict the priority of the wireless data by identifying whether the wireless data has a real-time priority, a non-time-critical priority, or a background priority, the one or more processors being configured to generate the RFE budget based on whether the wireless data has the real-time priority, the non-time-critical priority, or the background priority.

Example 6 includes the electronic device of any one of examples 1-5 or some other example or combination of examples herein, wherein the one or more processors is configured to predict the data type by predicting whether the wireless data is continuous data, single burst data, or periodic burst data, the one or more processors being configured to generate the RFE budget for the radio based on whether the wireless data is continuous data, single burst data, or periodic burst data.

Example 7 includes the electronic device of any one of examples 1-6 or some other example or combination of examples herein wherein, when the wireless data is the periodic burst data, the radio is configured to transmit a first data burst in the periodic burst data without transmit power backoff and is configured to transmit a subsequent data burst in the periodic burst data with a transmit power backoff.

Example 8 includes the electronic device of any one of examples 1-7 or some other example or combination of examples herein wherein, when the wireless data is the continuous data, the radio is configured to evenly distribute the RFE budget in time across an RFE consumption period.

Example 9 includes the electronic device of any one of examples 1-8 or some other example or combination of examples herein, wherein the RFE budget comprises a specific absorption rate (SAR) budget.

Example 10 includes the electronic device of any one of examples 1-9 or some other example or combination of examples herein, wherein the RFE budget comprises a maximum permissible exposure (MPE) budget.

Example 11 includes a method of operating a radio on an electronic device, the method comprising: receiving wireless data generated by one or more software applications executed by one or more processors; receiving a radio-frequency exposure (RFE) budget from the one or more processors; receiving a data prediction from the one or more processors that classifies one or more characteristics of the wireless data; and transmitting the wireless data based on the RFE budget and the data prediction using one or more antennas.

Example 12 includes the method of example 11 or some other example or combination of examples herein, further comprising: when the data prediction indicates that the wireless data includes periodic burst data, transmitting a first data burst in the periodic burst data without transmit power backoff.

Example 13 includes the method of examples 11 or 12 or some other example or combination of examples herein, further comprising: measuring a consumed RFE associated with transmission of the first data burst; projecting an RFE for remaining data bursts in the periodic burst data based on the consumed RFE and a data burst periodicity identified by the data prediction; transmitting a subsequent data burst in the periodic burst data without transmit power backoff when the projected remaining RFE is less than a remaining RFE in the RFE budget; and transmitting the subsequent data burst with a transmit power backoff when the projected remaining RFE exceeds the remaining RFE in the RFE budget.

Example 14 includes the method of any one of examples 11-13 or some other example or combination of examples herein, further comprising: when the data prediction indicates that the wireless data includes continuous data, calculating a remaining data transmission duration based on a size of the wireless data identified by the data prediction and an average achievable uplink throughput for the radio; when the remaining data transmission duration exceeds a duration of a consumption period identified by the RFE budget, transmitting the continuous data evenly across the consumption period; and when the remaining data transmission duration is less than the duration of the consumption period, transmitting the continuous data while using a majority of the RFE budget within the remaining data transmission duration.

Example 15 includes the method of any one of examples 11-14 or some other example or combination of examples herein, further comprising: when the data prediction indicates that the wireless data includes single burst data, calculating the remaining data transmission duration based on the size of the wireless data identified by the data prediction and a projected uplink throughput for the radio in transmitting the single burst data.

Example 16 includes a method of operating an electronic device having a radio, one or more processors, and one or more antennas, the method comprising: with the one or more processors, generating classification information characterizing one or more characteristics of application data to be wirelessly transmitted for one or more software applications executed by the one or more processors; with the one or more processors, generating a radio-frequency exposure (RFE) budget based on the classification information; and with the radio, using the one or more antennas to wirelessly transmit the application data subject to the RFE budget.

Example 17 includes method of example 16 or some other example or combination of examples herein, wherein generating the classification information comprises: classifying a data type of the application data; classifying a size of the application data; classifying a burst periodicity of the application data; and classifying a transmission priority of the application data.

Example 18 includes the method of example 16 or 17 or some other example or combination of examples herein, further comprising: with the one or more processors, increasing the RFE budget when the application data includes continuous data.

Example 19 includes the method of any one of examples 16-18 or some other example or combination of examples herein, further comprising: with the one or more processors, decreasing the RFE budget when the application data includes single burst data.

Example 20 includes the method of any one of examples 16-19 or some other example or combination of examples herein, further comprising: with the one or more processors, scaling the RFE budget based on a burst periodicity of the application data when the application data includes periodic burst data.

Example 21 includes a method of operating an electronic device having a radio, one or more processors, and one or more sensors, the method comprising: with the one or more processors, generating a radio-frequency exposure (RFE) budget; with the one or more sensors, gathering sensor data; with the one or more processors, reserving a first amount of the RFE budget for control signaling when the sensor data indicates that the electronic device is stationary; with the one or more processors, reserving a second amount of the RFE budget for the control signaling when the sensor data indicates that the electronic device is in motion, the second amount being greater than the first amount; and with the radio, transmitting wireless data according to a portion of the RFE budget that is not reserved for control signaling.

Example 22 includes the method of example 21 or some other example or combination of examples herein, further comprising: with the one or more processors, generating the second amount of the RFE budget based on a location of the electronic device identified by the sensor data.

Example 23 includes the method of examples 21 or 22 or some other example or combination of examples herein, further comprising: with the one or more processors, generating the second amount of the RFE budget based on a speed of the electronic device identified by the sensor data.

Example 24 includes the methods of any one of examples 21-23 or some other example or combination of examples herein, further comprising: with the one or more processors, identifying a location of the electronic device based on the sensor data; with the one or more processors, identifying crowd-sourced control signaling information associated with electronic devices having the location and the speed; with the one or more processors, predicting an amount of control signaling based on the crowd-sourced control signaling information; and with the one or more processors, generating the second amount of the RFE budget based on the predicted amount of control signaling.

Example 25 includes the methods of any one of examples 21-24 or some other example or combination of examples herein, further comprising with the one or more processors, generating the second amount of the RFE budget based on whether the radio is operating in the SA mode or the NSA mode.

Example 26 includes the methods of any one of examples 21-25 or some other example or combination of examples herein, further comprising: with the one or more processors, identifying a negative-acknowledgement (NACK) rate associated with transmission of the wireless data by the radio; and with the one or more processors, increasing the second amount of the RFE budget reserved for control signaling when the NACK rate exceeds a threshold value.

Example 27 includes the methods of any one of examples 21-26 or some other example or combination of examples herein, wherein increasing the second amount of the RFE budget comprises assigning additional RFE budget to slots carrying acknowledgement (ACK) messages.

Example 28 includes the methods of any one of examples 21-27 or some other example or combination of examples herein, wherein the wireless data comprises voice-over-LTE (VoLTE) data, the method further comprising: with the one or more processors, identifying an uplink block error rate (UL BLER) associated with transmission of the VoLTE data by the radio; and with the one or more processors, increasing the second amount of the RFE budget reserved for control signaling when the UL BLER rate exceeds a threshold value.

Example 29 includes an electronic device comprising: a sensor configured to generate sensor data; one or more antennas; a radio communicably coupled to the one or more antennas; and one or more processors configured to generate a radio-frequency exposure (RFE) budget for the radio based on application data to be transmitted by the radio, predict, based on the sensor data, an amount of control signaling to be used by the radio in transmitting the application data; and allocate a control signaling reservation in the RFE budget based on the predicted amount of control signaling, the radio being configured to transmit the application data according to the RFE budget using the one or more antennas.

Example 30 includes the electronic device of example 29 or some other example or combination of examples herein, wherein the one or more processors is configured to allocate a larger control signaling reservation in the RFE budget when the sensor data indicates that the electronic device is in motion than when the sensor data indicates that the electronic device is stationary.

Example 31 includes the electronic device of example 29 or 30 or some other example or combination of examples herein, wherein the one or more processors is configured to predict the amount of control signaling based on a speed of the electronic device identified by the sensor data.

Example 32 includes the electronic device of any one of examples 29-31 or some other example or combination of examples herein, wherein the one or more processors is configured to predict the amount of control signaling based on a location of the electronic device identified by the sensor data.

Example 33 includes the electronic device of any one of examples 29-32 or some other example or combination of examples herein, wherein the one or more processors is configured to predict the amount of control signaling based on whether the radio is operating in a standalone (SA) mode or a non-standalone (NSA) mode.

Example 34 includes the electronic device of any one of examples 29-33 or some other example or combination of examples herein, wherein the one or more processors is configured to predict the amount of control signaling based on crowd-sourced control signaling information associated with one or more additional electronic devices.

Example 35 includes the electronic device of any one of examples 29-34 or some other example or combination of examples herein, wherein the sensor comprises a motion sensor and the sensor data comprises motion sensor data.

Example 36 includes the electronic device of any one of examples 29-35 or some other example or combination of examples herein, wherein the sensor comprises a satellite navigation receiver and the sensor data comprises satellite navigation data.

Example 37 includes a method of operating an electronic device comprising: with the one or more processors, generating a radio-frequency exposure (RFE) budget; with a radio, using one or more antennas to convey radio-frequency signals according to the RFE budget; with the radio, generating wireless performance metric data; and with the one or more processors, boosting a control signal reservation in the RFE budget when the wireless performance metric data exceeds a threshold value.

Example 38 includes the method of example 37 or some other example or combination of examples herein, wherein the wireless performance metric data comprises a negative-acknowledgement (NACK) rate, the one or more processors being configured to boost the control signal reservation in the RFE budget when the NACK rate exceeds the threshold value.

Example 39 includes the method of example 37 or 38 or some other example or combination of examples herein, the one or more processors being configured to assign additional RFE budget to slots carrying acknowledgement (ACK) messages when the wireless performance metric data exceeds a threshold value.

Example 40 includes the method of any one of examples 37-39 or some other example or combination of examples herein, wherein the radio-frequency signals comprise voice-over-LTE (VoLTE), the wireless performance metric data comprises uplink block error rate (UL BLER), and the one or more processors is configured to assign additional RFE budget for VoLTE when the UL BLER exceeds the threshold value.

Example 41 may include an apparatus comprising means to perform one or more elements of a method described in or related to any of examples 1-40 or any combination thereof, or any other method or process described herein.

Example 42 may include one or more non-transitory computer-readable media comprising instructions to cause an electronic device, upon execution of the instructions by one or more processors of the electronic device, to perform one or more elements of a method described in or related to any of examples 1-40 or any combination thereof, or any other method or process described herein.

Example 43 may include an apparatus comprising logic, modules, or circuitry to perform one or more elements of a method described in or related to any of examples 1-40 or any combination thereof, or any other method or process described herein.

Example 44 may include a method, technique, or process as described in or related to any of examples 1-40 or any combination thereof, or portions or parts thereof.

Example 45 may include an apparatus comprising: one or more processors and one or more non-transitory computer-readable storage media comprising instructions that, when executed by the one or more processors, cause the one or more processors to perform the method, techniques, or process as described in or related to any of examples 1-40, or any combination thereof, or portions thereof.

Example 46 may include a computer program comprising instructions, wherein execution of the program by a processing element is to cause the processing element to carry out the method, techniques, or process as described in or related to any of examples 1-40, or any combination thereof, or portions thereof.

Any of the above-described examples may be combined with any other example (or combination of examples), unless explicitly stated otherwise. The foregoing description of one or more implementations provides illustration and description but is not intended to be exhaustive or to limit the scope of aspects to the precise form disclosed.

The foregoing is merely illustrative and various modifications can be made to the described embodiments. The foregoing embodiments may be implemented individually or in any combination.

What is claimed is:

1. An electronic device comprising:
   one or more antennas;
   a radio communicatively coupled to the one or more antennas; and
   one or more processors configured to
      generate a radio-frequency exposure (RFE) budget for the radio based on a data type and a burst periodicity of application data to be transmitted for an application executed by the one or more processors, the radio being configured to transmit a radio-frequency signal carrying the application data using the one or more antennas while limiting RFE of the radio according to the RFE budget,
      generate the RFE budget to include a first amount of budget in response to the application data having a first burst periodicity, wherein the first burst periodicity is non-zero, and
      generate the RFE budget to include a second amount of budget higher from the first amount of budget in response to the application data having a second burst periodicity that is higher than the first burst periodicity.

2. The electronic device of claim 1, the one or more processors being further configured to:
   generate the RFE budget for the radio based on a size of the application data.

3. The electronic device of claim 1, the one or more processors being further configured to:
   generate the RFE budget for the radio based on a priority of the application data.

4. The electronic device of claim 3, the one or more processors being configured to generate the RFE budget based on whether the application data has a real-time priority, a non-time-critical priority, or a background priority.

5. The electronic device of claim 1, the one or more processors being configured to generate the RFE budget for the radio based on whether the application data is continuous data, single burst data, or periodic burst data.

6. The electronic device of claim 5 wherein, when the application data is the periodic burst data, the radio is configured to transmit a first data burst in the periodic burst data without transmit power backoff and is configured to transmit a subsequent data burst in the periodic burst data with a transmit power backoff.

7. The electronic device of claim 5 wherein, when the application data is the continuous data, the radio is configured to evenly distribute the RFE budget in time across an RFE consumption period.

8. The electronic device of claim 1, wherein the RFE budget comprises a specific absorption rate (SAR) budget or a maximum permissible exposure (MPE) budget.

9. The electronic device of claim 1, wherein:
   the radio is configured to transmit periodic bursts of the application data in the radio-frequency signal during a predetermined time period associated with the RFE budget,
   the periodic bursts have the burst periodicity,
   the one or more processors are configured to measure an amount of RFE consumed while the radio transmits the periodic bursts,
   the one or more processors are configured to project an amount of RFE for remaining data bursts of the application data during the predetermined time period based on the burst periodicity and the measured amount of RFE consumed while the radio transmits the periodic bursts,
   the one or more processors are configured to identify a remaining amount of the RFE budget for the predetermined time period based on the measured amount of RFE consumed while the radio transmits the periodic bursts,
   the radio is configured to transmit a subsequent burst of the application data without any transmit power backoff during the predetermined time period responsive to the projected amount of RFE being less than the remaining amount of the RFE budget, and
   the radio is configured to transmit the subsequent burst of the application data with a transmit power backoff during the predetermined time period responsive to the projected amount of RFE exceeding the remaining amount of RFE budget.

10. A method of operating an electronic device having a radio, one or more processors, and one or more antennas, the method comprising:
    generating, using the one or more processors, classification information characterizing one or more characteristics of application data to be wirelessly transmitted for one or more software applications executed by the one or more processors, wherein the one or more characteristics of the application data comprise one or more characteristics about a content of the application data;
    generating, using the one or more processors, a radio-frequency exposure (RFE) budget based on the classification information; and
    using the radio and the one or more antennas to wirelessly transmit the application data subject to the RFE budget, wherein using the radio and the one or more antennas to wirelessly transmit the application data comprises using the radio and the one or more antennas to transmit a radio-frequency signal that is modulated to carry the application data, and generating the RFE budget includes
       generating the RFE budget to include a first amount of budget in response to the classification information indicating that the application data has a first characteristic; and
       generating the RFE budget to include a second amount of budget different from the first amount of budget in response to the classification information indicating that the application data has a second characteristic different than the first characteristic.

11. The method of claim 10, wherein generating the classification information comprises:
    classifying a data type of the application data;
    classifying a size of the application data;
    classifying a burst periodicity of the application data; and
    classifying a transmission priority of the application data.

12. The method of claim 10, further comprising:
    increasing, using the one or more processors, the RFE budget when the application data includes continuous data.

13. The method of claim 12, further comprising:
decreasing, using the one or more processors, the RFE budget when the application data includes single burst data.

14. The method of claim 13, further comprising:
scaling, using the one or more processors, the RFE budget based on a burst periodicity of the application data when the application data includes periodic burst data.

15. A method of operating wireless circuitry comprising:
transmitting, using a radio, application data during a fixed time period while limiting a radio-frequency exposure (RFE) of the radio according to an RFE budget;
generating, using one or more processors, the RFE budget to include a first amount of budget for the fixed time period in response to the application data having a continuous data type; and
generating, using the one or more processors, the RFE budget to include a second amount of budget for the fixed time period in response to the application data having a periodic burst data type, wherein the second amount of budget is different than the first amount of budget.

16. The method of claim 15, wherein the application data has a first data type during a first time period and has a second data type that is different from the first data type during a second time period that is after the first time period.

17. The method of claim 15, further comprising:
generating, using the one or more processors, the RFE budget to include a third amount of budget for the fixed time period in response to the application data having a single burst data type, wherein the third amount of budget is different than the first and second amounts of budget, and wherein transmitting the application data comprises:
when the data type is the periodic burst data type, transmitting a first burst of the application data without transmit power backoff during a first time period and transmitting a second burst of the application data with a transmit power backoff during a second time period after the first time period.

18. The method of claim 15, wherein the first amount of budget is evenly distributed across the fixed time period.

* * * * *